(12) United States Patent
Thies et al.

(10) Patent No.: US 7,704,608 B2
(45) Date of Patent: Apr. 27, 2010

(54) METHOD OF PREPARING NANO-STRUCTURED SURFACE COATINGS AND COATED ARTICLES

(75) Inventors: Jens C. Thies, Maastrict (NL); Edwin Currie, Sittard (NL); Guido J. W. Meijers, Stein (NL); Keqi Gan, Geneva, IL (US)

(73) Assignee: DSM IP Assets B.V., Heerlen (NL)

( * ) Notice: Subject to any disclaimer, the term of this patent is extended or adjusted under 35 U.S.C. 154(b) by 168 days.

(21) Appl. No.: 11/724,252

(22) Filed: Mar. 15, 2007

(65) Prior Publication Data
US 2008/0248312 A1 Oct. 9, 2008

Related U.S. Application Data

(62) Division of application No. 10/958,657, filed on Oct. 6, 2004.

(30) Foreign Application Priority Data

| May 20, 2003 | (EP) | .................... 03076510 |
| Feb. 20, 2004 | (EP) | .................... 04075534 |
| May 13, 2004 | (WO) | ............... PCT/NL2004/00329 |

(51) Int. Cl.
*B32B 5/16* (2006.01)

(52) U.S. Cl. ................................... 428/515
(58) Field of Classification Search .................. None
See application file for complete search history.

(56) References Cited

U.S. PATENT DOCUMENTS

| 2,601,123 | A | | 6/1952 | Moulton |
| 3,661,744 | A | | 5/1972 | Kehr |
| 5,582,859 | A | * | 12/1996 | Tong et al. ............... 427/126.3 |
| 5,744,514 | A | | 4/1998 | Shustack |
| 6,025,455 | A | | 2/2000 | Yoshitake |
| 6,291,070 | B1 | | 9/2001 | Arpac |
| 6,391,459 | B1 | | 5/2002 | Szum |
| 6,455,103 | B1 | | 9/2002 | Mennig |
| 6,646,080 | B2 | | 11/2003 | Chawla |
| 6,686,047 | B2 | | 2/2004 | Yamaguchi |
| 6,863,518 | B2 | * | 3/2005 | Powers .................. 425/145 |

FOREIGN PATENT DOCUMENTS

| DE | 197 46 885 | 6/1999 |
| JP | 58042001 | 3/1981 |
| WO | 00/18696 | 4/2000 |
| WO | 01/91466 | 11/2001 |

OTHER PUBLICATIONS

Ibn-Elhaj et al; "Optical Polymer Thin Films with Isotropic and Anistropic Nano-Corregated Surface Topologies"; Letters to Nature; vol. 410; Apr. 12, 2001; pp. 796-799.
Meng, Yuezhong et al; Crosslinking of Poly(raylene disulfide)s and Poly(arylene sulfane)s Derived from Cyclic(arylene disulfide) Oligomers; Journal of Applied Polymer Science; vol. 74; 1999; pp. 3069-3077.
Chen, Dinguo; "Anti-reflection (AR) Coatings Made by Sol-Gel Processes: a Review"; Solar Energy Materials & Solar Cells; vol. 68; 2001; pp. 313-336.
Nun, Edwin et al; "Lotus-*Effect®*"—Surfaces; Macromol. Symp.; vol. 187; 2002; pp. 677-682.
Walheim, Stefan et al; "Nanophase-Separated Polymer Films as High-Performance Antireflection Coatings"; Science; vol. 283; No. 5401; 1999; p. 520.
Balta Calleja, F.J. et al; "Microhardness of Polymers"; Chapter II; Cambridge Un. Press; 2000; pp. 11-42.

* cited by examiner

*Primary Examiner*—Sheeba Ahmed
(74) *Attorney, Agent, or Firm*—Nixon & Vanderhye P.C.

(57) ABSTRACT

The invention relates to new processes for the preparation of antireflective coatings and coated substrates, as well as articles produced by these processes. These coatings can include one or more layers made of materials which form nano-structured and/or nano-porous surfaces. The process can include applying a cross-linkable hard coat to a substrate, partially curing or cross-linking the hard coat, and then applying a second coat carried by a solvent or mixture of solvents capable of swelling the partially cured hard coat. The second coat is then cross-linked and grafted to the hard coat to produce a durable coated substrate with antireflective properties.

4 Claims, 9 Drawing Sheets

METHOD OF PREPARING NANO-STRUCTURED SURFACE COATINGS AND COATED ARTICLES

CROSS REFERENCE TO RELATED APPLICATION

This application is a divisional of commonly owned copending U.S. application Ser. No. 10/958,657, filed on Oct. 6, 2004, which claims the benefit of priority of PCT/NL2004/00329, filed May 13, 2004, the entire content thereof being hereby expressly incorporated by reference in this application.

FIELD

The invention relates to a new process for the preparation of nano-structured and/or nano-porous surfaces, coatings having a nano-structured and/or nano-porous surface and articles comprising said coatings. The invention also relates to the use of said coatings, in particular as anti-reflective coatings.

BACKGROUND AND SUMMARY

The drive for ever smaller features sizes in surfaces and coatings has been brought about through a desire to achieve attractive properties for applications in, for example microelectronics, anti-reflective coatings for displays and super-hydrophobic or even self cleaning surfaces. The numerous techniques for preparation of nano-structured surfaces or coatings can be regarded as fitting into one of two classes.

The first class is know as the top down approach and is primarily concerned with the manufacture of progressively smaller and smaller feature sizes in photolithographic processes. Top down lithographic techniques are especially applied where regular and straight features are required as is the case for photo-resists in the microprocessor field. Manufacture of random, irregular structures and structuring via these techniques over large surface areas ($dm^2$ to $m^2$) is extremely difficult, time consuming and therefore expensive.

The second class of nano-structuring techniques can be regarded as so-called bottom up techniques and are usually based on phase separation, which can be achieved in two ways. Firstly, by phase separation of two incompatible polymers (e.g. Polymethylmethacrylate and Polystyrene, Steiner et al., Science, Vol 283, pg 520-522, 1999), during the evaporation of a solvent. After that the nano-structure is formed by removal of one of the polymers by a selective solvent, that dissolves only one of the polymers.

Secondly, phase separation can be induced by crosslinking a mixture of components where at least one component is capable of crosslinking and at least one other is not (Ibn-Elhaj and Schadt, Nature, Vol 410, pg 796-799, 2001). The mixture is homogeneous prior to crosslinking and the phase separation occurs during the formation of the crosslinked network. The nano-structure is formed by removal of the non-crosslinkable component. As phase separation is a dynamic process, the size and distribution of the features formed under both of the above techniques is strongly dependent on the rate or kinetics of the phase separation. Parameters such as temperature and in the case of photo-induced crosslinking the photo-initiator concentration and/or radiation intensity all will affect the feature size of the nano-structured coatings. Therefore processing is complicated and reproducibility is poor. Also the necessary washing to remove one of the components is a sizable hurdle in the commercialisation of such technologies, especially for large surface areas. Thus, there is a need for an simple technique that allows the manufacture of nano-structured coatings.

Preparation of surface nano-structured and/or nano-porous coatings or films can be achieved by a process which includes the steps of a) applying a mixture, which mixture comprises
   i) reactive nano-particles, having reactive organic groups on their surface
   ii) a solvent
   iii) optionally a compound having at least one polymerisable group in an amount that is small enough to allow the formation of a nano-structured surface after cure of the formulation, to a substrate, b) polymerising the mixture on the substrate.

By using no or only a little of the compound having at least one polymerisable group, a coating or a film is obtained with the process of the present invention having a nano-structured surface. Furthermore the coating or film has favourable mechanical properties and adheres well on several substrates. The coating or film has a variety of applications, among which are films or coatings having super hydrophobic properties and especially coatings having anti-reflective properties.

A new process for applying an antireflective coating to a substrate is also disclosed. The process comprises the steps of
   a) applying a first coating to the substrate, said first coating being cross-linkable,
   b) partially cross-linking the first coating,
   c) providing a second coating, said second coating being cross-linkable and being carried in a solvent capable of partially swelling the first coating,
   d) applying the second coating and solvent to the partially cross-linked first coating, and
   e) cross-linking the second coating.

The first coating can be a hard coat and the second coating a layer with a nano-structured surface as described herein. By partially cross-linking the first coating and swelling it with a solvent, good adhesion between the first and second coatings can be achieved. As a result, use of the process of the present invention can result in a durable, scratch-resistant antireflective coated substrate which is more readily manufacturable, is produced using fewer processing steps and in higher yields, and is less expensive than conventional antireflective coatings.

From U.S. Pat. No. 2,601,123 a coating for reducing surface reflections is known for the coating of glass substrates. The coating however must be sintered at very high temperatures, so that it is not suitable for application on polymer substrates. Furthermore it relates to very old and abandoned technology.

It is known from U.S. Pat. No. 5,582,859 that anti-reflective properties may be obtained by preparing a multilayer system of coatings in which each coating has a carefully selected thickness and refractive index. However, multilayer coatings suffer from two sets of problems. The first is that the anti-reflective performance of multilayer coatings suffers from angle-dependency (D. Chen, Solar Energy Materials & Solar Cells, 86 (2001) 313-336). This means that transmission will vary from the normal to oblique angles. Secondly, reproducible processing of such multilayer coatings with precisely controlled thickness and optical properties is difficult and therefore costly and time-consuming.

Also in U.S. Pat. No. 6,455,103 a similar multi-layer anti-reflective coating is applied, giving the same problems as explained above.

In DE 19746885 A1 a process for coating a substrate with a mixture comprising reactive nanoparticles is disclosed. However there is no teaching given how to obtain the surface nano-structured and/or nanoporous coating of the present invention and the anti-reflective properties are poor.

Figure 1A:
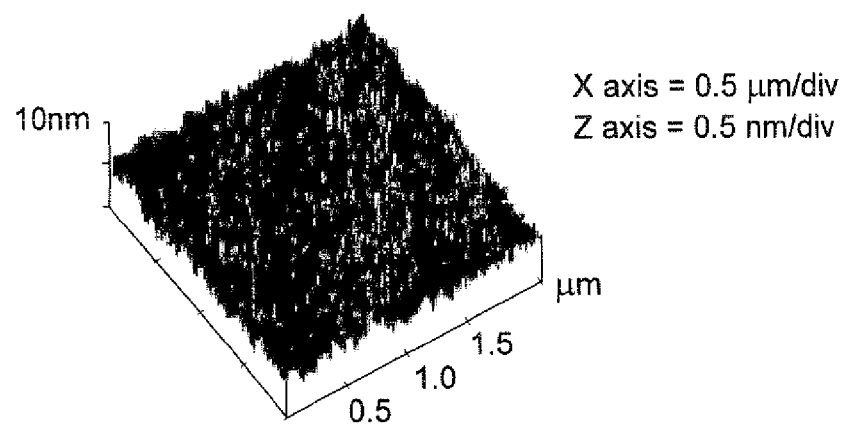
FIGS. 1A-1E depict three dimensional (3D) topography of coatings obtained in various examples and comparative experiments described below acquired by atomic force microscopy (AFM)
Figure 1B:
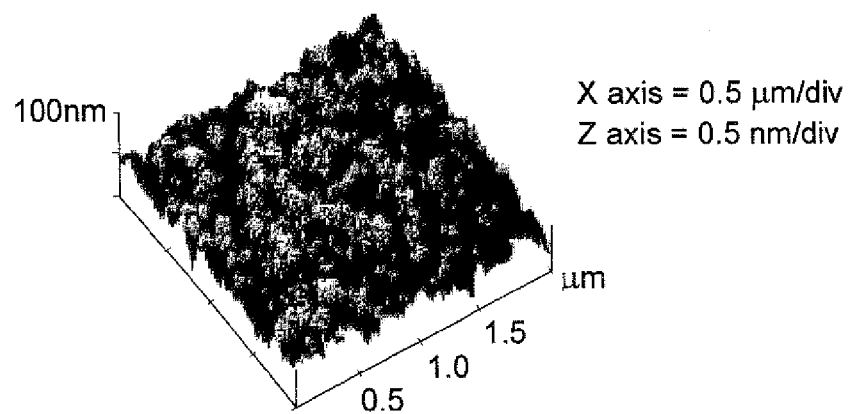
Figure 1C:
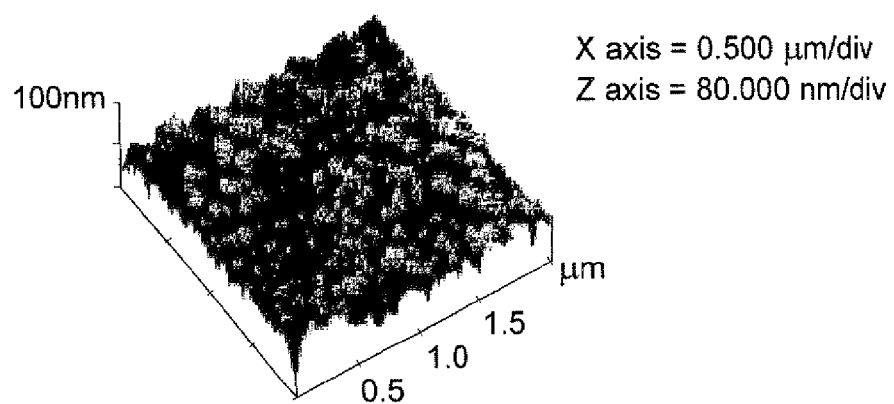
Figure 1D:
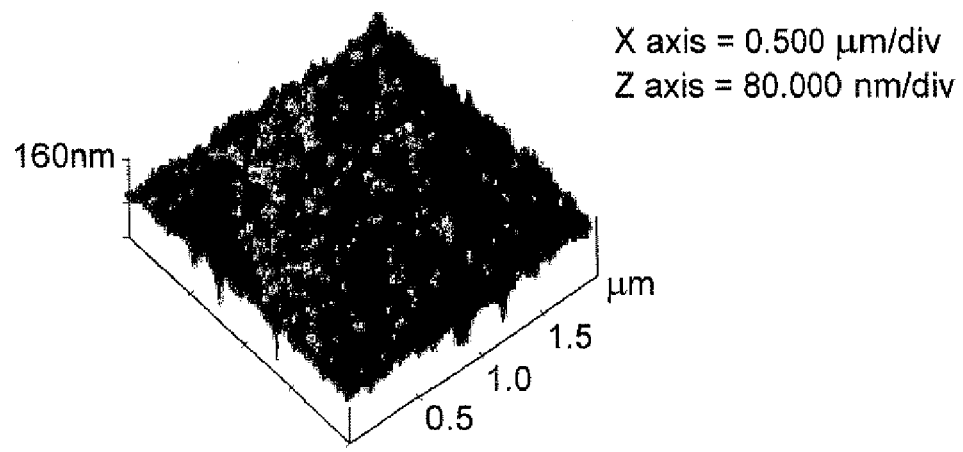
Figure 1E:
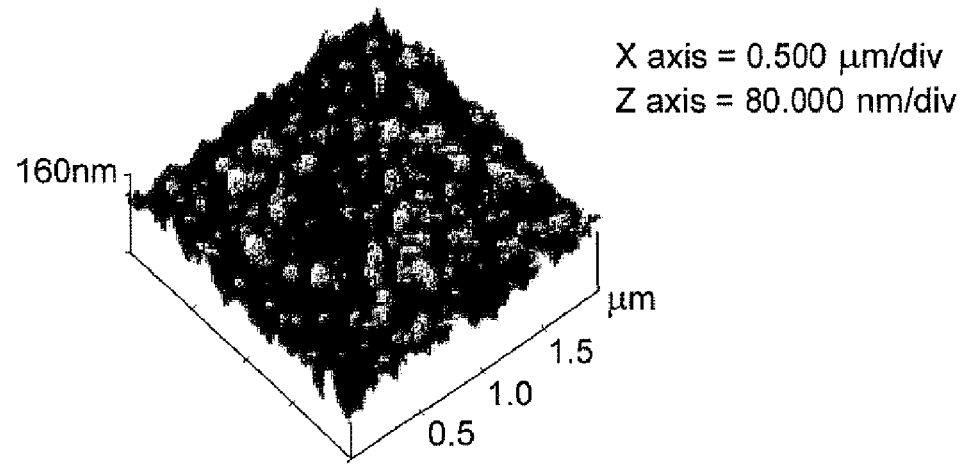

Since the reactive nano-particles in step a) always have more than one reactive group on their surface, the polymerisation in step b results in the formation of a crosslinked phase, comprising the nanoparticles interconnected. Therefore, in this text, the terms polymerise or polymerisation is used interchangeably with cross-linking or cross-linked and polymerisable group is used interchangeably with cross-linking group.

Within the context of the invention the term surface nano-structured coatings refers to coatings having a surface roughness, and in which surface the dimensions of the features on the surface are larger than or equal to the smallest cross-sectional dimension of an individual nano-particle. Preferably the dimensions of the features are smaller than 1200 nm, more preferably smaller than 800 nm, still more preferably smaller than 400 nm, most preferably smaller than 300 nm. There also may be nanosized voids in the coating.

In the framework of this invention the term "nano-particles" is defined as particles of which the majority has a diameter of less than a micrometer. Within the framework of the invention a nano-particle is elongated when the aspect ratio, defined as the length divided by the diameter is greater than unity. The preparation of reactive nano-particles as such is known in the art, and has been described in e.g. U.S. Pat. No. 6,025,455. In a preferred embodiment of the process according to the invention, all nano-particles are reactive.

The compound having at least one polymerisable group is in this text also referred to as both diluent or reactive diluent. In this text the term hard coat refers to a coating comprising nano-particular species, optionally reactive nano-particular species, in a crosslinked polymeric network, wherein the volume fraction of reactive diluent is such that there are no or at least hardly no void spaces and/or surface nano-structures present in the coating.

For obtaining the nano-structured surface it is important that no or a relatively small amount of the reactive diluent and optional further components is present in the coating obtained with the process according to the invention. If a too high amount of reactive diluent and optional further components is used, the nano particles will be embedded and a coating having a smooth surface and not having any pores will be obtained. Normally the amount of reactive diluent and eventually further components in the final coating (after evaporation of the solvent) as expressed in volume fraction may not exceed 1-(the random close packing volume traction of the reactive nanoparticles). The skilled person can easily determine the amount of diluent and eventually further additives by varying the amount and measuring the surface roughness or a parameter as for instance the transmission or the reflection of the coating as a function of this amount. Above a certain concentration of reactive diluent (or optionally further additives) the surface roughness of the coating has vanished and no special anti-reflective properties are detected any more.

Furthermore the invention also relates to the mixture for the preparation of nano-structured and/or nano-porous coatings, the coatings or films obtained from the process according to the invention, articles comprising said coatings and the use of said coatings.

Reactive Nano-Particles

In a preferred embodiment, the majority of the nano-particles in the mixture according to the invention have a diameter of less than 400 nm, more preferably the majority of particles have a diameter of less than 50 nm. Most preferably all particles have a diameter of less than 50 nm. In a preferred embodiment, the majority of the nano-particles have a length in the range of 40 to 300 nm. Preferably, the particles used have such a dimensions that they do not (or not significantly) influence the transparency of the eventual coating. Most preferably the increase in haze of a transparent substrate comprising the coating in a thickness of 0.1 micrometer, compared to the substrate not yet comprising the coating is less than 2%, preferably less than 1%, most preferably less than 0.5%.

As will be obvious to anyone skilled in the art, the random packing density of the nano-particular species is determined by the shape and the relative size and size distribution of the nano-particles. Hence it may be advantageous to use nano-particles of differing shapes and sizes to precisely control the size of the surface nano-structures and/or nano-pores.

In a preferred embodiment, the reactive nano-particles have an aspect ratio greater than 1, more preferably, they have an aspect ratio (length/diameter) greater than 3, still more preferably greater than 5, and most preferably, they have an aspect ratio of greater than 10. If elongated reactive nano-particles are used it is possible to obtain a coating having even further improved anti-reflective properties or to use a higher concentration of reactive diluent, which gives better mechanical properties to the coating. More preferably the nanoparticles are wormlike. Of a wormlike nano particle the primary axis is curved.

Methods for determining the particle dimension include optical or scanning electron microscopy, or atomic force microscopy (AFM) imaging.

For measuring the dimensions of the nano-particles the particles are in a very dilute mixture applied on a surface in a thin layer, so that at a SEM photographic image of the layer, the single nano-particles are observable. Than from 100 nanoparticles, ad random selected, the dimensions are determined and the average value is taken. In case of particles having an aspect ratio above 1, like worm-shaped nano-particles, the total length is determined, from one end to the other end, by following the primary axis as projected in the plane of the photo. For the diameter the longest straight line that can be drawn from one side of the particle to the other side, perpendicular to the primary axis is taken.

In the process according to the invention the coating may comprise either organic or inorganic nano-particles. Examples of organic nano-particles are carbon nano-tubes or nano-spheres. Preferably, the nano-particles are inorganic nano-particles. Suitable inorganic particles are for example oxide particles. Preferred oxide particles are particles of an oxide selected from the group of aluminium oxide, silicium oxide, zirconium oxide, titanium oxide, antimony oxide, zinc oxide, tin oxide, indium oxide, and cerium oxide. It is also possible to use a mixture of particles from different oxides or to use particles of mixed oxides. Most preferably, the nano-particles are particles of aluminium oxide, zirconium oxide or silicium oxide. The refractive index of the coating and effective refractive index of the coating/air interface can in part be tuned by the choice of oxide used.

The nano-particles have reactive organic groups on their surface. Such reactive nano-particles may or may not comprise additional, non-reactive organic groups. Additional non-polymerisable groups may be used to tune the overall polarity and thus the hydrophobicity or hydrophilicity of the particle and the resultant coating. In a preferred embodiment of the process according to the invention, all nano-particles are reactive nanoparticles. The reactive groups of the nano-particles, and if present, the polymerisable groups of the diluent may polymerise in a homopolymerisation reaction or a copolymerisation reaction. In such a case the reactive groups are polymerisable groups. A copolymerisation reaction is possible when in the mixture different groups are present that can polymerise, for example if the groups of the particles and of the reactive diluent are different, or if mixtures of reactive diluent and reactive/or particles are used that comprise such different groups. It is also possible that the reactive groups of the nanoparticles react with a polymer network that is formed by the polymerisation of one or more reactive diluents. Important however, is that the nanoparticles are chemically interconnected in a cross-linked phase.

Preferably the reactive groups of the reactive nano-particles are polymerisable groups.

The preparation of reactive nano-particles as such is known in the art, and has been described in e.g. U.S. Pat. No. 6,025,455.

Substrates

A wide variety of substrates may be used as a substrate in the process according to the invention. Suitable substrates are for example flat or curved, rigid or flexible substrates including films of for example polycarbonate, polyester, polyvinyl acetate, polyvinyl pyrollidone, polyvinyl chloride, polyimide, polyethylene naphthalate, polytetrafluoro ethylene, nylon, polynorbornene or amorphous solids, for example glass or crystalline materials, such as for example silicon or gallium arsenide. Metallic substrates may also be used. Preferred substrates for use in display applications are for example glass, polynorbornene, polyethersulfone, polyethyleneterphtalate, polyimide, cellulose triacetate, polycarbonate and polyethylenenaphtalate.

A free-standing single layer anti-reflective film obtainable by a process according to the invention may be obtained by preparing a film or coating on a substrate and subsequently removing the film or coating from the substrate after crosslinking. The removal of the film or coating from the substrate should always take place after the crosslinking.

Application of the Mixture to a Substrate

The mixture may be applied onto the substrate by any process known in the art of wet coating deposition. Examples of suitable processes are spin coating, dip coating, spray coating, flow coating, meniscus coating, capillary coating and roll coating.

Preferably the mixture according to the invention is applied in a single layer. In this case it is possible that the mixture is applied on a further coating, as long as this is not a coating according to the invention.

Typically, the reactive nano-particles are mixed with at least one solvent and, optionally crosslinking initiator and optionally a reactive diluent, to prepare a mixture that is suitable for application to the substrate using the chosen method of application.

Solvent

In principle, a wide variety of solvents may be used. The solvent preferably has the ability to form stable suspensions of the reactive nano-particles in order to facilitate a random close packing arrangement of the reactive nano-particles upon application, i.e. after evaporation of the solvent.

Nano-particles typically are added to the mixture in the form of a suspension. The same solvent as used in the suspension may be used to adjust the mixture so that it has the desired properties. However, other solvents may also be used.

Preferably the solvent used evaporates after applying the mixture onto the substrate. In the process according to the invention, optionally the mixture nay after application to the substrate be heated or treated in vacuum to aid evaporation of the solvent.

Examples of solvent that may be suitable are 1,4-dioxane, acetone, acetonitrile, chloroform, chlorophenol, cyclohexane, cyclohexanone, cyclopentanone, dichloromethane, diethyl acetate, diethyl ketone, dimethyl carbonate, dimethylformamide, dimethylsulphoxide, ethanol, ethyl acetate, m-cresol, mono- and di-alkyl substituted glycols, N,N-dimethylacetamide, p-chlorophenol, 1,2-propanediol, 1-pentanol, 1-propanol, 2-hexanone, 2-methoxyethanol, 2-methyl-2-propanol, 2-octanone, 2-propanol, 3-pentanone, 4-methyl-2-pentanone, hexafluoroisopropanol, methanol, methyl acetate, methyl acetoacetate, methyl ethyl ketone, methyl propyl ketone, n-methylpyrrolidone-2, n-pentyl acetate, phenol, tetrafluoro-n-propanol, tetrafluoroisopropanol, tetrahydrofuran, toluene, xylene and water. Alcohols, ketones and esters based solvents may also be used, although the solubility of acrylates may become an issue with high molecular weight alcohols. Halogenated solvents (such as dichloromethane and chloroform) and hydrocarbons (such as hexanes and cyclohexanes), may also be suitable. Preferably methanol, methyl ethyl ketone or isopropanol are used.

Compound having at Least one Polymerisable Group (Also called "Diluent" or "Reactive Diluent")

In principle, a wide variety of materials are suitable to be used as the reactive diluent. The relative amount of reactive diluent with respect to the relative amount of reactive nano-particles must be so small that it allows formation of a nano-structured surface. A way of determining of a coating has a surface nano-structure and/or nano-pores, is to apply the coating to a transparent substrate, crosslinking, and subsequently measuring the transmission. Preferably the amount of reactive diluent and optional further components in the mixture is that low, that if applied as a coating at one side of a transparent substrate, in a thickness between 100-200 nm, there is an increase in transmission of light at at least one wave length between 400 and 800 nm of at least 0.5% relative to the same substrate without the coating. Preferably the increase in transmission is at least 0.75%, more preferably at least 1%, still more preferably at least 1.5%, still more preferably at least 2%, still more preferably at least 2.5%, most preferably at least 3%. The exact amount of reactive diluent depends on the particle size, shape, and size distribution, and can thus not be given exactly. In case of elongated nano particles the amount of diluent may be less than 40 wt %, relative to the total weight of the mixture as applied in step a) of the process according to the invention, however without taking the solvent into account (total weight of solid). Preferably, the amount of diluent is less than 20wt %. Although it is not necessary to use any diluent, the mechanical properties of the coating will generally be better when at least some diluent is present, e.g., at least 1 wt %, more preferably at least 2 wt. %, still more preferably at least 5 wt. %, most preferably at least 10 wt. %. With respect to this aspect the advantage of the elongated particles and of these especially the wormlike nano particles becomes evident, as it is possible with these particles to apply a relatively high amount of reactive diluent to obtain very favourable mechanical properties and yet still having a well developed nano-structured surface, resulting for example in good antireflective properties.

As mentioned, in principle a wide variety of materials are suitable to be used as the reactive diluent, for example monomers or oligomers having crosslinking groups. Monomers or oligomers having only one crosslinking group per molecule may be used, but preferably in combination with other crosslinking components that do have at least two crosslinking groups. Preferably monomers or oligomers having at least two or more crosslinking groups per molecule are used. It is also possible that the reactive diluent comprises a mixture of compounds that after the induction of crosslinking in step b, together form a crosslinked phase. The mixture may comprise compounds that are by itself crosslinking, such as for example different acrylates or it may comprise compounds that will not crosslink by itself but which form a crosslinked phase in combination with another compound after initiation of the crosslinking reaction, for example copolymerising systems comprising electron rich and electron poor double bonds such as for example maleate/vinyl ether copolymerising systems.

Examples of monomers suitable for use as a reactive diluent and having at least two crosslinking groups per molecule include monomers containing (meth)acryloyl groups such as trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, C7-C20 alkyl di(meth)acrylates, trimethylolpropanetrioxyethyl (meth)acrylate, tris(2-hydroxyethyl) isocyanurate tri(meth)acrylate, tris(2-hydroxyethyl) isocyanurate di(meth)acrylate, pentaerythritol tri(meth)acrylate, pentaerythritol tetra(meth)acrylate, dipentaerythritol monohydroxy pentacrylate, dipentaerythritol hexacrylate, tricyclodecane diyl dimethyl di(meth)acrylate and alkoxylated versions, preferably ethoxylated and/or propoxylated, of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether, adduct of hydroxyethyl acrylate, isophorone diisocyanate and hydroxyethyl acrylate (HIH), adduct of hydroxyethyl acrylate, toluene diisocyanate and hydroxyethyl acrylate (HTH), and amide ester acrylate.

Examples of suitable monomers having only one crosslinking group per molecule include monomers containing a vinyl group, such as N-vinyl pyrrolidone, N-vinyl caprolactam, vinyl imidazole, vinyl pyridine; isobornyl (meth)acrylate, bornyl (meth)acrylate, tricyclodecanyl(meth)acrylate, dicyclopentanyl(meth)acrylate, dicyclopentenyl (meth)acrylate, cyclohexyl(meth)acrylate, benzyl(meth)acrylate, 4-butylcyclohexyl(meth)acrylate, acryloyl morpholine, (meth)acrylic acid, 2-hydroxyethyl (meth)acrylate, 2-hydroxypropyl(meth)acrylate, 2-hydroxybutyl(meth)acrylate, methyl (meth)acrylate, ethyl(meth)acrylate, propyl (meth)acrylate, isopropyl(meth)acrylate, butyl (meth)acrylate, amyl(meth)acrylate, isobutyl(meth)acrylate, t-butyl (meth)acrylate, pentyl (meth)acrylate, caprolactone acrylate, isoamyl(meth)acrylate, hexyl(meth)acrylate, heptyl (meth)acrylate, octyl(meth)acrylate, isooctyl(meth)acrylate, 2-ethylhexyl (meth)acrylate, nonyl(meth)acrylate, decyl(meth)acrylate, isodecyl(meth)acrylate, tridecyl(meth)acrylate, undecyl(meth)acrylate, lauryl(meth)acrylate, stearyl(meth)acrylate, isostearyl (meth)acrylate, tetrahydrofurfuryl(meth)acrylate, butoxyethyl(meth)acrylate, ethoxydiethylene glycol(meth)acrylate, benzyl(meth)acrylate, phenoxyethyl (meth)acrylate, polyethylene glycol mono(meth)acrylate, polypropylene glycol mono(meth)acrylate, methoxyethylene glycol(meth)acrylate, ethoxyethyl(meth)acrylate, methoxypolyethylene glycol(meth)acrylate, methoxypolypropylene glycol(meth)acrylate, diacetone(meth)acrylamide, beta-carboxyethyl(meth)acrylate, phthalic acid (meth)acrylate, isobutoxymethyl(meth)acrylamide, N,N-dimethyl(meth)acrylamide, t-octyl (meth)acrylamide, dimethylaminoethyl (meth)acrylate, diethylaminoethyl(meth)acrylate, butylcarbamylethyl(meth)acrylate, n-isopropyl(meth)acrylamide fluorinated (meth)acrylate, 7-amino-3,7-dimethyloctyl (meth)acrylate, N,N-diethyl (meth)acrylamide, N,N-dimethylaminopropyl(meth)acrylamide, hydroxybutyl vinyl ether, lauryl vinyl ether, cetyl vinyl ether, 2-ethylhexyl vinyl ether; and compounds represented by the following formula (I)

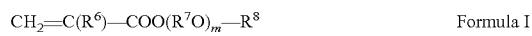

$$CH_2=C(R^6)-COO(R^7O)_m-R^8 \qquad \text{Formula I}$$

wherein $R^6$ is a hydrogen atom or a methyl group; $R^7$ is an alkylene group containing 2 to 8, preferably 2 to 5 carbon atoms; and m is an integer from 0 to 12, and preferably from 1 to 8; $R^8$ is a hydrogen atom or an alkyl group containing 1 to 12, preferably 1 to 9, carbon atoms; or, $R^8$ is a tetrahydrofuran group-comprising alkyl group with 4-20 carbon atoms, optionally substituted with alkyl groups with 1-2 carbon atoms; or $R^8$ is a dioxane group-comprising alkyl group with 4-20 carbon atoms, optionally substituted with methyl groups; or $R^8$ is an aromatic group, optionally substituted with $C_1$-$C_{12}$ alkyl group, preferably a $C_8$-$C_9$ alkyl group, and alkoxylated aliphatic monofunctional monomers, such as ethoxylated isodecyl(meth)acrylate, ethoxylated lauryl (meth)acrylate, and the like.

Oligomers suitable for use as the reactive diluent are for example aromatic or aliphatic urethane acrylates or oligomers based on phenolic resins (ex. bisphenol epoxy diacrylates), and any of the above oligomers chain extended with ethoxylates. Urethane oligomers may for example be based on a polyol backbone, for example polyether polyols, polyester polyols, polycarbonate polyols, polycaprolactone polyols, acrylic polyols, and the like. These polyols may be used either individually or in combinations of two or more. There are no specific limitations to the manner of polymerization of the structural units in these polyols. Any of random polymerization, block polymerization, or graft polymerization is acceptable. Examples of suitable polyols, polyisocyanates and hydroxyl group-containing (meth)acrylates for the formation of urethane oligomers are disclosed in WO 00/18696, which is incorporated herein by reference.

Combinations of compounds that together may result in the formation of a crosslinked phase and thus that in combination are suitable to be used as the reactive diluent are for example carboxylic acids and/or carboxylic anhydrides combined with epoxies, acids combined with hydroxy compounds, especially 2-hydroxyalkylamides, amines combined with isocyanates, for example blocked isocyanate, uretdion or carbodiimide, epoxies combined with amines or with dicyandiamides, hydrazinamides combined with isocyanates, hydroxy compounds combined with isocyanates, for example blocked isocyanate, uretdion or carbodiimide, hydroxy compounds combined with anhydrides, hydroxy compounds combined with (etherified) methylolamide ("amino-resins"), thiols combined with isocyanates, thiols combined with acrylates or other vinylic species (optionally radical initiated), acetoacetate combined with acrylates, and when cationic crosslinking is used epoxy compounds with epoxy or hydroxy compounds.

Further possible compounds that may be used as the reactive diluent are moisture curable isocyanates, alkoxy titanates, alkoxy zirconates, or urea-, urea/melamine-, melamine-formaldehyde or phenol-formaldehyde (resol, novolac types), or radical curable (peroxide- or photo-initiated) ethylenically unsaturated mono- and polyfunctional monomers and polymers, e.g. acrylates, methacrylates, maleate/vinyl ether), or radical curable (peroxide- or photo-initiated) unsaturated e.g. maleic or fumaric, polyesters in styrene and/or in methacrylates.

Method for Crosslinking or Polymerisation

Any cross-linking method that may cause the mixture to crosslink so that a coating is formed is suitable to be used in the process according to the invention. Suitable ways to initiate crosslinking are for example electron beam radiation, electromagnetic radiation (UV, Visible and Near IR), thermally and by adding moisture, in case moisture curable compounds are used. In a preferred embodiment crosslinking is achieved by UV-radiation. The UV-crosslinking may take place through a free radical mechanism or by a cationic mechanism, or a combination thereof. In another preferred embodiment the crosslinking is achieved thermally.

Initiator

An initiator may be present in the mixture to initiate the crosslinking reaction. The amount of initiator may vary between wide ranges. A suitable amount of initiator is for example between above 0 and 5 wt % with respect to total weight of the compounds that take part in the crosslinking reaction.

When UV-crosslinking is used to initiate crosslinking, the mixture preferably comprises a UV-photo-initiator. A photo-initiator is capable of initiating a crosslinking reaction upon absorption of light, thus, UV-photo-initiators absorb light in the Ultra-Violet region of the spectrum. Any known UV-photo-initiators may be used in the process according to the invention.

The coating according to the invention can be prepared in any desired thickness. The coatings according to the invention typically have a thickness ranging between 50 nm to several micrometer. In case of application as an anti-reflective coating the thickness is preferably between 50 and 200 nm, more preferably between 100 and 150 nm.

In a preferred embodiment, the nano-structured and/or nano-porous films or coatings according to the invention increases the optical transmission of a substrate on which they are present for at least a range of visible wavelengths of the electromagnetic spectrum. Therefore the coating shows a reflection of light, at at least one wavelength in the area between 400-800 nm, measured under normal incidence of less than 3%, preferably less than 2%, more preferably less than 1.5%, most preferably less than 1%, per coated side of the substrate in a coating layer thickness between 100-200 nm.

The combination of good mechanical properties as well as anti-reflective performance will allow for the use of these single layer anti-reflective hard-coats in applications were mechanical durability and anti-reflective performance on flat or on non-flat substrates are advantageous. These applications include anti-reflective coatings for automobile and airplane wind screens, displays in general, television tubes, flexible displays and lenses, for example in spectacles. It is possible that the anti-reflective coating is applied to the substrate as a single coating. It is also possible that before the application of the anti-reflection coating, the substrate is coated with a further coating, for example to improve the adhesion between the anti-reflective coating and the substrate. At least an advantage of the anti-reflective coating of the present invention is, that the coating, bringing the anti-reflective properties only needs to be applied in a single layer, In yet a further embodiment the surface nano-structured and/nano-porous coating according to the invention can be used to affect the wetting properties of the coating.

Generally, a hydrophobic material or coating is characterised by a static contact angle of water of 90° or above.

Hydrophobic polymeric materials such as poly(tetrafluorethene) (PTFE) or polypropylene (PP) have been available for decades. These materials suffer from a limited hydrophobicity, as well as inferior mechanical properties as compared to engineering materials or highly crosslinked coatings. For instance, PP has a static contact angle of water of roughly 100° whereas PTFE, which is amongst the most hydrophobic polymeric material known, has a static contact angle of water of roughly 112°.

Some hydrophobic coatings are being referred to in the art as superhydrophobic coatings. Superhydrophobic coatings are generally defined by a static water contact angle above 140° (Nun, Oles & Schleich, Macromol. Symp. 187 (2002) 677-682).

Within the framework of the invention, a combination of surface roughness, due to surface nano-structures and/or nano-pores, together with polar surface chemistry achieves static water contact angles below 60°, preferably below 40°. Conversely, the coating may also be affected so that the static water contact angle is above 90° and preferably 120° if the surface chemistry of the nano-structured and/nano-porous coating is apolar, for example via the presence of apolar surface modifying groups on the nano-particles.

Combining the wetting properties with the anti-reflection properties, the surface nano-structured and/or nano-porous films or coatings according to the invention increases the optical transmission of a substrate on which they are present to visible wavelengths of the electromagnetic spectrum while simultaneously exhibiting a static water contact angle of above 90°, preferably 120° and most preferably 140°.

Furthermore due to the surface nano-structures and/or nano pores other properties such as low refractive index, low optical dissipation (low optical loss), low dielectric constant, high relative surface area, low contact area, low adhesion and coating porosity are envisaged. Applications derived from the above properties include the following: anti-reflective coatings for all kinds of display applications, for biological devices and coatings with improved wetting characteristics; easy to clean and self-cleaning coatings; easy to clean and self-cleaning anti-reflective coatings; non-stick coatings, low dielectric coatings for semi-conductors, low dissipation (low optical loss) coatings for optical wave guides; controlled release coatings, hard membranes, biologically active surfaces, anti-fouling and anti-bacterial coatings.

When it is desirable to have patterned coatings, for example, alternating hydrophobic and hydrophilic regions, this can also be achieved by the process according to the invention, by using photolithographic processes. Hence, applications where patterning of nano-structured and/or nano-porous coatings is desired may also result. This could lead to coatings and articles where the optical or wetting properties are patterned as desired.

In a preferred embodiment the mixture according to the invention comprises an adhesion promoter. An adhesion promoter enhances the adhesion between the coating of the present invention and its substrate. In this way the scratch resistance of the coating is also improved.

The skilled artisan knows how to select a suitable adhesion promoter for given groups at the surface of the reactive nanoparticles, reactive diluent and substrate.

Examples of suitable adhesion promoters are compounds having at least one reactive group capable of reacting with the groups at the surface of the reactive nano particles and/or with the reactive diluent and further have at least one reactive group capable of reacting or physically interacting, e.g. H bonding with the substrate.

For glass substrates adhesion promoters can include but are not limited to acrylate, methacrylate or thiol functional trialkoxy silanes, where the trialkoxy groups of the silane can be propoxy or butoxy but is preferably ethoxy or methoxy. Examples of silane adhesion promoters include: γ-mercaptopropylmethylmonomethoxysilane, γ-mercaptopropylmethyidimethoxysilane, γ-mercaptopropyltrimethoxysilane, γ-mercaptopropylmonoethoxysilane, γ-mercaptopropyldiethoxysilane, γ-mercaptopropyltriethoxysilane, β-mercaptoethylmonoethoxysilane, β-mercaptoethyltriethoxysilane, β-mercaptoethyltriethoxysilane, N-(2-aminoethyl)-3-aminopropylmethyidimethoxysilane, N-(2-aminoethyl)-3-aminopropyltrimethoxysilane, γ-aminopropyltriethoxysilane, γ-glycidoxylpropyltrimethoxysilane, γ-glycidoxyl propylmethyldimethoxysilane, 2-(3,4-epoxycyclohexyl) ethyltrimethoxysilane, γ-chloropropylmethyldimethoxysilane, γ-chloropropyltrimethoxysilane, and γ-methacryloyloxypropyltrimethoxysilane. Examples of commercially available products of these compounds include SILAACE S310, S311, S320, S321, S330, S510, S520, S530, S610, S620, S710, S810 (manufactured by Chisso Corp.), Siquest A-174NT (manufactured by OSI Specialties—Crompton Corp.). SH6062, AY43-062, SH6020, SZ6023, SZ6030, SH6040, SH6076, SZ6083 (manufactured by Toray-Dow Corning Silicone Co., Ltd.), KBM403, KBM503, KBM602, KBM603, KBM803, KBE903 (manufactured by Shin-Etsu Silicone Co., Ltd.), and the like. Also acidic adhesion promoters such as acrylic acid may be used. Phosphate esters such as Eb168 or Eb170 from UCB are feasible adhesion promoters.

For adhesion to polymeric substrates such as, for example polyethylene terephthalate (PET) and or cellulose triacetate (TAC) the above adhesion promoters may be feasible but also good results are obtained with epoxy functional acrylate or methacrylate compounds.

Surprisingly, it has been found that for substrates containing vinyllic unsaturation, for example acrylate or methacrylate based substrates, like a crosslinked coating, for example a hard coat, compounds comprising at least one thiol group are very suitable as adhesion promoters. Such thiol compounds may be mono-functional, di-functional, preferably tri-functional and most preferably tetra-functional with respect to the number of thiol groups per molecular species. The thiol compounds may comprise next to the thiol group a further reactive group. In case the thiol compound comprises only one thiol group, it must comprise at least one further reactive group. Examples of thiol compounds may be any of those known in the art. A description of the most common thiol compounds may be found at column 9, lines 1-41 of U.S. Pat. No. 3,661,744, which is incorporated herein by reference. Certain polythiols such as the aliphatic monomeric polythiols e.g. ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis are suitable. Examples of the polythiol compounds preferred because of relatively low odor level include but are not limited to esters of thioglycolic acid (HS—$CH_2COOH$), α-mercaptopropionic acid (HS—$CH(CH_3)$—COOH and β-mercaptopropionic acid (HS—$CH_2CH_2COOH$) with polyhydroxy compounds such as glycols, triols, tetraols, pentaols, hexaols, and the like. Specific examples of the preferred polythiols include but are not limited to ethylene glycol bis(thioglycolate), ethylene glycol bis (β-mercaptopropionate), trimethytolpropane tris(thioglycolate), trimethylolpropane tris (β-mercaptopropionate), pentaerythritol tetrakis (β-mercaptopropionate), all of which are commercially available. A specific example of a preferred polymeric polythiol is polypropylene ether glycol bis(β-mercaptopropionate) which is prepared from polypropyleneether glycol (e.g. Pluracol P201, Wyandotte Chemical Corp.) and β-mercaptopropionic acid by esterfication. Poly-α-mercaptoacetate or poly-β-mercaptopropionate esters, particularly the trimethylopropane triesters or pentaerythritol tetra esters are preferred. Other polythiols which can be suitably employed include alkyl thiol functional compounds such as 1,2-dimercapthoethane, 1,6-dimercaptohexane and the like. Thiol terminated polysulfide resins may also be employed.

Suitable examples of aliphatic dithiols include 1,2-ethanedithiol, butanedithiol, 1,3-propanedithiol, 1,5-pentanedithiol, 2,3-dimercapto-1-propanol, dithioerythritol, 3,6-dioxa-1,8-octanedithiol, 1,8-octanedithiol hexanedithiol, dithiodiglycol, pentanedithiol, decanedithiol, 2-methyl 1,4 butanedithiol, bis-mercaptoethylphenyl methane, 1,9-nonanedithiol(1,9-dimercaptononane), glycol dimercaptoacetate.

Suitable examples of aromatic dithiols include 1,2-benzenedithiol, 1,3-benzenedithiol, 1,4-benzenedithiol, 2,4,6-trimethyl-1,3-benzenedimethanethiol, durene-α1, α2-dithiol, 3,4-dimercaptotoluene, 4-methyl-1,2-benzenedithiol, 2,5-dimercapto-1,3,4-thiadiazole, 4,4'-thiobisbezenedithiol, bis(4-mercaptophenyl)-2,2'-propane(bisphenol dithiol) (made according to the method of Meng Y. Z., Hay. A. S., J. of App. Polym. Sci., V74, 3069-3077(1999).

Suitable examples of oligomeric dithiols include difunctional mercapto functional urethane oiigomers derived from end capping moieties of hydroxyethyl mercaptan, hydroxypropyl mercaptan, dimercaptopropane, dimercapto ethane as described in patent by Shustack U.S. Pat. No. 5,744,514.

Examples of suitable trithiol functional compounds include, trimethylolethane tris-mercaptopropionate, trimethylolpropane tris-mercaptopropionate (TMPTSH), trimethylolethane tris-mercaptoacetate, and trimethylolpropane tris-mercaptoaacetate glycerol tri(11-mercaptoundecanoate), trimethylol propane tri(11-mercaptoundecate). A preferred trithiol is trimethylolpropane tris(2-mercapto-propionate) TMPTSH.

Examples of suitable tetrafunctional thiols include pentaerythritol tetramercapto propionate, pentaerythritol tetramercapto acetate, and pentathritoltetra(11-mercaptoundecate)

Examples of multifunctional thiols having functionality greater than 4, include polythiols as described on page 7 of WO 88/02902.

Multi functional thiols can be obtained by reacting thioalkyl carboxylic acids e.g. thioglycolic acid, mercapto propionic acid with high functional alcohols, amines and thiols. Furthermore, multifunctional thiols can be obtained by reacting mercapto alkyl trialkoxy silanes with silanols that may be polymeric or silica based silanols.

Other preferred multifunctional thiols are obtained using thiol carboxylic acids (HS—R—COOH) where R=alkyl, or aryl groups eg thioundecanoic acid of which the COOH groups are reacted with reactive enes, alcohols, thiols or amines that are multifunctional.

The adhesion promoters may be used in an amount of 0.1-10 wt-% of the total solids in the mixture, after evaporation of the solvent. Preferably the adhesion promoter is used in an amount of 5-10 wt-%.

A further improvement of the scratch resistance is obtained if the mixture according to the invention comprises a compound having a surface energy of less than 25 milli Joules per square meter ($mJ/m^2$). The surface energy is preferably measured of the pure compound according to ASTM D2578, preferably using a ACCU DYNE TEST™ marker pen. An example of such compounds are reactive polydimethylsiloxane compounds. Preferred are reactive fluoro compounds. Reactive fluoro compounds are for example described in U.S. Pat. No. 6,391,459. The fluoro compounds further have the advantage that they don't disturb the anti-reflective properties very much.

Processes for Coating a Substrate to Form an Antireflective Coating

In a further embodiment the substrate is in a first step coated with a first coating. Although the phrase "first coating" is used herein, it will be understood that the first coating may either be applied directly to the substrate or onto one or more layers that have been previously applied to the substrate, such as, by way of example, a high refractive index coating that has been applied onto an existing hard coat layer. The first coating is preferably a cross-linkable material and, still more preferably, a material that can be highly crosslinked to form a hard coat, although it will be understood that materials which are cured or hardened by other methods may be used as well. In a second step, a second coating that alone or in combination with other layers contributes to the creation of antireflective properties (referred to herein as the "antireflective coating") can be applied on top of the first coating. Typically, the second coating is a nano-structured or nano-porous coating of the type described above. However, it will be understood that other coatings which, either alone or in combination with other layers, contribute to the creation of antireflective properties (such as high-refractive index and low-refractive index layers) may also serve as the second coating. In this regard, coatings of the type disclosed in U.S. Pat. Nos. 6,646,080 and 6,686,047, which are incorporated herein by reference and made a part hereof, can be used as a second coating. In this way the first coating acts as a substrate for one or more additional layers. In a preferred embodiment, the first coating preferably comprises vinyllic unsaturations and thiol compounds are preferably used as adhesion promotors. Use of such materials results in still better scratch resistance of the coating of the present invention.

When the first coating is intended to be a hard coat, preferred materials for the first coating are the coatings described in EP-A-1276810, which is incorporated by reference and made a part hereof. Such hard coats are selected in order to optimize the adhesion between the hard coat and the underlying coated or uncoated substrate as well as between the hard coat and the antireflective coating.

In a preferred process for practicing the present invention, during or after the step of applying the first coating, the first coating is partially cured or under-cured, at least on its surface. This means that while the first coating appears to be fully cured, its surface is rendered less resistant to attack by solvents and thus swells (at least partially) during the application of the antireflective coating.

In the event the first coating comprises a radical curing resin system, such as an acrylate-based resin system, such partial curing or under-curing can be effected by utilizing a dose of UV radiation that is insufficient to cause substantially complete cross-linking of the first coating. Alternatively, and preferably, the first coating is cured in the presence of oxygen, for example in an air atmosphere instead of in an inert atmosphere, such as a nitrogen atmosphere. This latter approach inhibits complete cross-linking or curing of the first coating. In this way a still further improved adhesion between the first coating and the second, antireflective coating can be obtained, resulting in a still further improvement of the scratch resistance of the coating according to the present invention.

When the first coating is comprised of a radical curing, acrylate-based resin system, the degree of under-curing can be measured using conventional methods of quantifying reacted acrylate unsaturation (% RAU) well known to those skilled in the art. In this regard, a 95% Relative RAU Dose Test Method can be employed. In this test method, a drop of the desired liquid coating is spin-coated on a KBr crystal until completely covered with the experimental coating at a thickness not exceeding 1.0 micron. The sample is scanned using 100 co-added scans and the spectrum is converted to absorbance. The net peak area of the acrylate absorbance at 810 $cm^{-1}$ of the liquid coating is then measured.

The net peak area is measured using the "baseline" technique in which a baseline is drawn tangent to absorbance minima on either side of the peak. The area under the peak and above the baseline is then determined.

The sample is exposed to a 100 W mercury lamp (model 6281 from Oriel Corp.) in an air atmosphere. The FTIR scan of the sample and the measurement of net peak absorbance for the spectrum of the cured coating are repeated. Baseline frequencies are not necessarily the same as those of the liquid coating, but are chosen such that the baseline was still tangent to the absorbance minima on either side of the analytical band. The peak area measurement for a non-acrylate reference peak of both the liquid and cured coating spectrum is repeated. For each subsequent analysis of the same formulation, the same reference peak, with the same baseline points, is utilized.

The ratio of the acrylate absorbance to the reference absorbance for the liquid coating is determined using the following equation:

$$R_L = \frac{A_{AL}}{A_{RL}}$$

where
$A_{AL}$=area of acrylate absorbance of liquid
$A_{RL}$=area of reference absorbance of liquid
$R_L$=area ratio of liquid In a similar manner, the ratio of the acrylate absorbance to the reference absorbance for the cured coating is determined using the equation:

$$R_F = \frac{A_{AF}}{A_{RF}}$$

where
$A_{AF}$=area of acrylate absorbance of cured coating
$A_{RF}$=area of reference absorbance of cured coating
$R_F$=area ratio of cured coating The degree of cure as percent-reacted acrylate unsaturation (% RAU) is calculated using the following equation:

$$\% \, RAU = \frac{(R_L - R_F) \times 100}{R_L}$$

where
$R_L$=area ratio of liquid
$R_F$=area ratio of cured coating

Some compositions containing an appreciable level of multifunctional acrylates are known to have relatively low % RAU values, even when fully cured ("% Ultimate RAU"), usually on the order of 55-70% RAU. For such compositions, "% Relative RAU" represents the degree of curing of a coating composition relative to its % Ultimate RAU, and is defined by the following equation:

% Relative RAU=((% RAU of test composition)/(% Ultimate RAU))100

For purposes of the present invention, the undercured first coat is preferably comprised of compositions having appreciable levels of multifunctional acrylates so that % Relative RAU is a useful method of measuring the degree of under-curing or partial cure. For such systems, it is preferred that the % Relative RAU of the under-cured or partially cross-linked first coat be less than about 90%, still more preferably less than about 80%, and most preferably 70% or less. Coatings have such properties are capable of being partially swelled when exposed to the solvent(s) so that good adhesion between this layer and the second layer can be achieved.

In a present method of carrying out the invention, the second coating is carried (for example, dispersed or dissolved) in one or more solvents and the carrying solvent(s) effectuate(s) the swelling of the under-cured first coating. (As used herein, the term "solvent" refers to one solvent or a mixture of a first solvent and one or more co-solvents.) However, it will be understood that the first coating could be pre-treated with one or more solvents in order to effect partial swelling of the first coating prior to application of the second coating.

Another way to establish that the first coating has been properly under-cured so as to obtain the desired improved adhesion and scratch resistance when treated with solvent and the second coating is applied thereto is to perform a solvent double rub test of the surface of the first coating. To conduct this test, a Q-TIP cotton applicator is soaked in a suitable solvent (for example, ethanol or another solvent in which the second coating is carried) and any excess solvent removed by squeezing. With the application of medium pressure (manually), the solvent-moistened Q-TIP applicator is rubbed twice along a test sample consisting of a substrate onto which the first coating or hard coat has been applied. The amount of coating removed by this test should be considerably greater than that removed from a fully cured hard coat, i.e., a hard coat cured at higher dose of radiation and/or under a nitrogen atmosphere, but should not result in substantial or total delamination of the hard coat from the substrate.

As described above, the second, antireflective coating is preferably carried (for example, dissolved or dispersed) in a solvent. When applying the antireflective coating to an under-cured or partially cured first coating, it is helpful to select the carrier solvent(s) in order to maximize the swelling of the first coating. Without being bound by theory, such swelling is believed to improve the adhesion between the hard coat and the antireflective coating. At the same time, it is also desirable to select solvents with relatively low volatility in order to improve the processability and quality of the resultant coatings. A person skilled in the art can select appropriate solvents designed to achieve these objectives based on the composition of the first coating. When the first coating comprises an acrylate-based resin system, solvents that may be employed to swell the first coating include, in addition to the solvents enumerated above, methanol, isopropyl alcohol, methyl isobutyl ketone, methyl ethyl ketone, 1-methoxy-2-propanol, 1-methoxy-2-propanol acetate butyl acetate, cyclohexanone, isobutyl isobutyrate, 2-heptanone, cyclopentanone, ethyl acetate, ethanol, acetone, diisobutyl ketone, methyl amyl ketone, n-butanol, isobutanol, sec-butanol, toluene, and xylene used in the amounts described above. 1-Methoxy-2-propanol, methyl isobutyl ketone and methyl ethyl ketone are preferred solvents for optimizing the swelling of acrylate-based coatings.

It has also been discovered that certain application techniques for depositing the second, antireflective coating are to be preferred in practicing the present invention. In particular, when using gravure (roll to roll) coating systems, it is desirable to minimize the gap between the metering or "doctor" blade and the substrate in order to create coatings which are uniform and sufficiently thin. In this regard, it is believed that a smaller gap helps to minimize localized evaporation of solvent, which can result in the metered layer becoming coarse or "grainy", which produces less desirable coatings. As noted above, it will also be understood that a solvents with lower volatility should be utilized in order to minimize such local evaporation.

In the practice of the present invention, the second layer is preferably within the range of 50-150 nm and, still more preferably, in the range of 100-150 nm, still more preferably, in the range of 80-120 nm and, most preferably, about 90 nm. The first layer (for example, the hard coat) is preferably within the range of 3-10 microns and, more preferably, 4-8 microns. These layer thicknesses are also preferred when other application techniques, such as slot die application methods, are employed. It will also be understood that other methods of applying thin coatings, such as vacuum deposition, may also be employed in the practice of the present invention.

Once the second, antireflective coating has been applied to the first coating, it is helpful, although not essential, to heat the antireflective coating while the solvent is being evaporated but prior to, or during, the step of curing the antireflective coating. Heating the antireflective coating in this manner improves the adhesion between the first coating and antireflective coating. It is preferred that the antireflective coating be heated to a temperature in excess of about 50 degrees C. and, more preferably to a temperature within the range of about 60 to about 90 degrees C.

After the second, antireflective coating is applied to the first coating, it is cured by conventional means. In a preferred process for carrying out the present invention, the antireflective coating is itself substantially completely cross-linked by exposing it to UV radiation. It is preferred that the antireflective coating be cured as fully as possible by exposing it to a sufficiently high dose of radiation (e.g. 1-2 $Jcm^{-2}$ and, preferably, about 1 $Jcm^{-2}$) to fully crosslink and thus graft it to the previously under-cured and solvent-treated first coating. It is also preferred that the curing be performed in an inert (for example, nitrogen) atmosphere to optimize the cross-linking of the second coating. As noted above, however, when multi-functional acrylates are used, substantially complete cross-linking may mean that only a fraction of the acrylate moieties are cross-linked. In this event, substantially complete cross-linking means that % Relative RAU of the second coating is at least 95% and preferably approaching 100%.

In this regard, the addition of chain transfer agents (such as, by way of example, trimethylol propane and tris(mercapto propionate)) to the second, antireflective coating is a presently preferred method of increasing the amount of cross-linking or cure of the antireflective coating.

When the first and second coatings are comprised of UV-curable resin systems, it has also been discovered that the selection of suitable photo-initiators and synergists can help to optimize the coating process of the present invention. In particular, the first coating preferably contains a type one photo-initiator without a synergist. The second coating or antireflective coating preferably contains a photo-initiator and a synergist, i.e., a molecule with labile hydrogen atom(s). The synergist can either be a molecular entity, such as triethanolamine, or a synergist moiety comprising part of a photo-initiator molecule, such as IRGACURE 907 (available from CIBA Specialty Chemicals), Michlers ketone, or analogues thereof. The second coating preferably includes either a type one or type two photo-initiator (e.g., benzophenone) in addition to the synergist.

Finally, an optional thermal treatment of the coated substrate using, for example, infra-red lights or thermal ovens positioned after the UV curing lights used to cure the second coating is helpful in achieving the optimal balance of optical surface and mechanical properties. Preferably the substrate coated with the first and second coatings is heated within the range of about 60 to about 100 degrees C. and, more preferably, within the range of about 70 to about 90 degrees C. for a period of up to about 5 minutes. Good results are obtained when both the second coating and preferably also the first coating comprise a thermal initiator for subsequent cross-linking during the thermal post-treatment, especially if the cure of first and second coatings has been induced photo-chemically. The skilled artisan knows how to select such a thermal initiator in order to optimize cross-linking.

As an alternative to under-curing a first coating or hard coat, the antireflective coating may be applied directly to a substrate that has been surface treated in order to enhance adhesion between the first and second coatings. Suitable surface treatment methods include corona treatment, as well as flame treatment and treatment with solvents, acids, bases or gas plasma. It is also possible to enhance adhesion between the first coating and the substrate (and, thus, between the first and second coatings) by applying a thin layer of a primer to the substrate before applying the second coating.

It is also possible to produce a film out of the composition according to the invention, and to use the film as a membrane.

It is also possible to use the coating according to the invention in a process of reverse sorption of at least one non-cross-linkable species.

EXAMPLES

Nano-Silicate Particles

Nano-silicate particles MT-ST (spherical particles) and IPA-ST-UP (elongated particles) were obtained from Nissan Chemical American Corporation. These particles were used in illustration of the invention. Their properties and properties of their suspensions are listed in table 1 below.

TABLE 1

Types and properties of nano-silica particles.

| Nano-particle | Particle Size (nm) | $SiO_2$ (wt %) | $H_2O$ (%) | Viscosity (mPa · s.) | Specific Gravity | pH | Particle Shape | Solvent |
|---|---|---|---|---|---|---|---|---|
| MT-ST | 10-15 | 30-31 | <2.0 | <5 | 0.98-1.02 | 2-4 | Spherical | Methanol |
| IPA-ST-UP | 9-15 Elongated* | 15-16 | <1.0 | <20 | 0.85-0.90 | 2-4 | Elongated* | Isopropanol |

*Elongated particles have a diameter of 9-15 nm with a length of 40-300 nm. (Information source www.snowtex.com).

A. Grafting of Spherical or Elongated Silica Nano-Particles:

Reactive organic groups were grafted onto the silica nano-oxide particles by adding a trimethoxy-silane compound comprising an acrylate group (e.g., a compound according to formula II) together with p-methoxy-phenol, a compound that inhibits polymerization of the acrylate groups, to a suspension of the oxide particles in methyl ethyl ketone. Table 2 shows the exact amounts of chemicals used. After stirring, a catalytic amount of water was added to the mixture and the mixture was refluxed at 80° C. for at least 3 hours. Subsequently as a dehydrating agent trimethyl orthoformate was added to remove any traces of water, and the resultant mixture stirred at 60° C. for at least one hour. Another method for preparing the grafted particles was to add a methoxy-silane compound comprising an acrylate group together with p-methoxy-phenol, to a suspension of the oxide particles in methanol. After stirring, the mixture was refluxed at 60° C. for at least 1.5 hours for MT-ST nano-silicates particles or at least 3 hours for IPA-ST-UP nano-silicate particles, and subsequently a trialkoxy silane compound, was added. As subsequent trialkoxy silane methyl trimethoxy silane, or in case hydrophobic apolar surface characteristics are required a perfluoroalkyl trialkoxy silane was used. After refluxing for at least one more hour at 60° C., a dehydrating agent was added and the resultant mixture was stirred at 60° C. for at least one hour.

B: Preparation of a Coating or Film on a Substrate

Thin films of various mixtures were prepared on microscope glass slides or polyethyleneteraphthalate (PET) films (for transmission measurements) and/or silicon wafers (for measurements of wetting properties and thickness determination) by the following procedure.

A drop of a mixture (see table 3 and 4 for the mixtures) was applied to the substrate by spin-coating at a rate of 4800 r.p.m. Thin films (100-200 nm) were spin coated from mixtures containing less than 10 wt-% solids while thicker (1-5 μm) coatings were spin coated from formulations with ca 35-50 wt-% solids, see table 3, 4 and 5. The resultant wet film was crosslinked with UV radiation using a D-bulb under nitrogen at a dose of 1.7 J/cm2. The thickness of the crosslinked transparent coating was measured with a multi-spectral reflectometer (F20, AG Electro Optics). Samples for contact angle determination were post baked (i.e heated) for 1 hour at 70° C., prior to contact angle determination C: Optical Properties of Surface Nano-Structured and/or Nano-Porous Coatings Nano-structured and/or nano-porous films or coatings were prepared as described under "B. Preparation of a coating on a substrate", on one side or both sides of either glass microscope slides or polyethyleneteraphthalate (PET) films from various formulations as listed in Table 3, 4 and 5. Spectral transmission in the visible region of the spectrum was measured with a Perkin-Elmer Lambda-20 UV-Vis spectrometer.

D: Measurement of Water Contact Angle

Static contact angles were measured using a FTA (First Ten Angstroms) 200 apparatus. This piece of equipment consisted of a motorised syringe pump, a sample stage and a video camera. The software used with the system was FTA Video drop shape analysis version 1.98 Build B.

Before the measurements were carried out the surface tension of the water in the syringe was measured. This was done by dispensing a droplet from the syringe, and then recording an image whilst the droplet was still attached to the syringe. The droplet was lit from behind, so it appeared black on a white background. The software measured the dimensions of the droplet and used them to calculate the surface tension.

The static contact angle of a coating was measured by dispensing a 12 μl droplet of distilled water onto the surface of a coated substrate. 65 images of the droplet were taken over a 130 second period. From the images the software determined the baseline (the surface) and the edges of the droplet, the contact angle was calculated where these lines intercept. The contact angles were determined for at least two droplets on different areas of the surface, the average of these measurements was quoted as the contact angle. Results of static contact angles for various coatings are given in table 6. Contact angle measurements were carried out either directly or after post-baking (t=0) or 2.5 days after post-baking (t=2.5 days). The values in table 6 are the contact angles 100 seconds after the drop had been deposited onto the surface of the samples of various ages.

E. Measurement of Hardness and Reduced Modulus of Coatings

Figure 8:
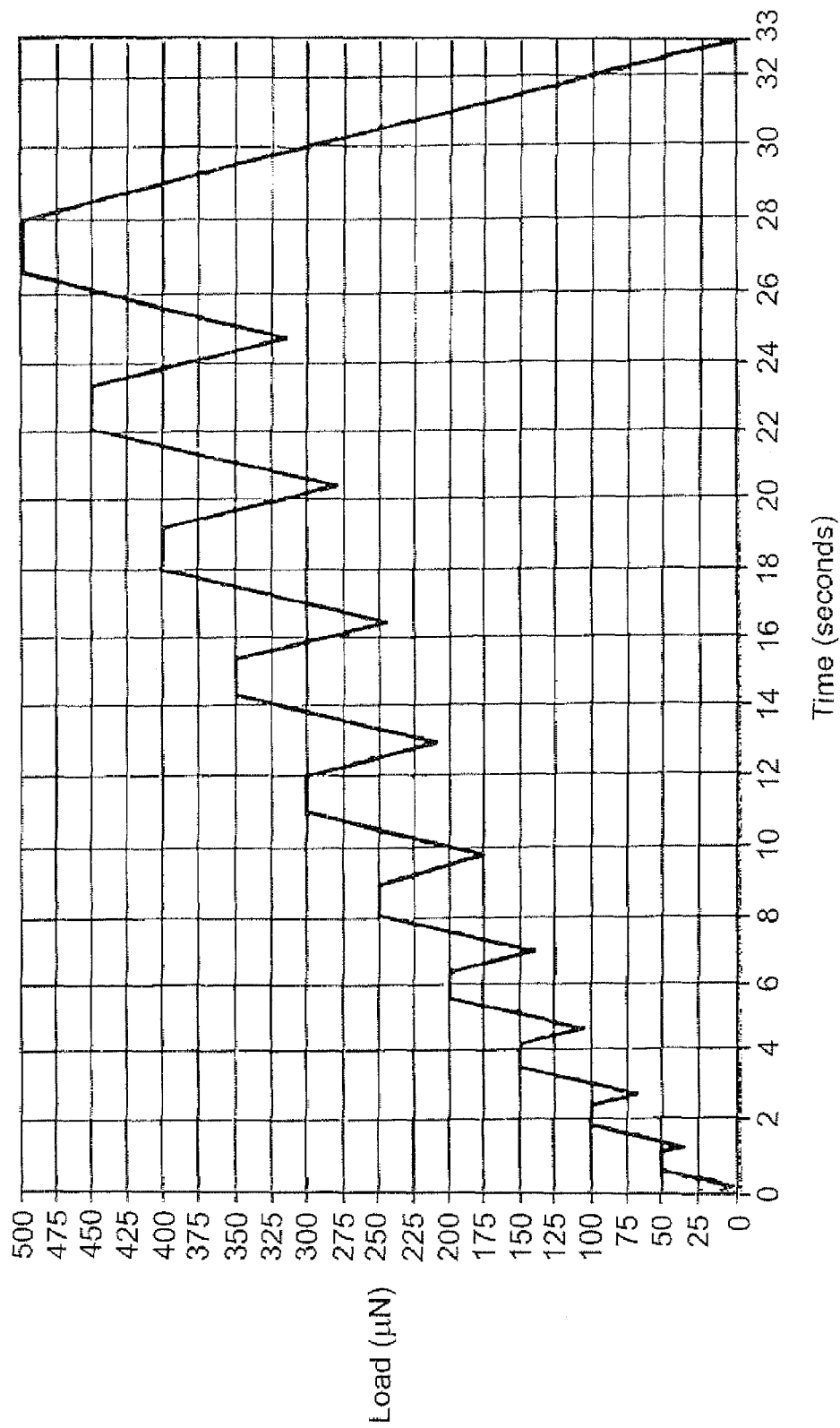
FIG. 8 is a graph of force versus displacement of a typical load function utilized to measure coating hardness.

To determine the hardness and reduced modulus of the spincoated coatings, three coatings were prepared as described above in B. The hardness measurements were performed with a Hysitron TriboScope, using a calibrated Berkovich diamond tip as indenter. The tip was inserted into the coatings with a known load, and the penetration depth in the coating was recorded. A typical load function used is shown in FIG. 8, this results in a graph of force versus displacement. The hardness was calculated via the relationship H (in GPa)= $F_{max}/24.5\ d^2$, where $F_{max}$ is the highest load applied and d is the penetration depth. The reduced modulus was calculated from the force–displacement curve using $E_r = 0.5(\pi/24.5\ d^2)^{1/2}\ (\delta F/\delta d)$. More details concerning nano-indentation experiments may be found in F. J. Balta Calleja & S. Fakirov, Microhardness of Polymer, Cambridge Un. Press, 2000.

It should be noted the results from nano-indentation with respect to hardness and reduced modulus are dependant on the geometry of the tip of the indenter used. Therefore, direct comparison can only be made by using an experimental set up with a tip of similar geometry.

TABLE 2

Compounds in weight percentage used for acrylation and surface modification of silica nano particles

| Material | Modified nano-particle A (Acry-MT-ST) | Modified nano-particle B (Acry-IPA-ST-UP) | Modified nano-particle C (Acry-F-MT-ST) |
|---|---|---|---|
| MT-ST nano-silica Particle size 10-15 nm | 24.75 wt-% | | 23.81 wt-% |
| IPA-ST-UP elongate nano-silica Particle diameter 9-15 nm Particle length 40-300 nm | | 13.85 wt-% | |
| Int-12A (coupling agent) (See formula II) | 7.84 wt-% | 4.55 wt-% | 7.71 wt-% |
| Hydroquinnone mono-methylether (HQMME polymerization inhibitor) | 0.14 wt-% | 0.87 wt-% | 0.14 wt-% |
| Methyltrimethoxysilane (MTMS surface derivatisation agent) | 1.23% wt-% | 0.72 wt-% | |
| 1H,1H,2H,2H-(Perfluorooctyl) triethoxysilane (apolar surface derivatisation agent) | | | 4.63 wt-% |
| Methanol (solvent) | 57.75 wt-% | | 55.54 |
| Isopropanol (solvent) | | 75.31 wt-% | |
| Trimethyl orthoformate OFM (dehydrating agent) | 8.29 wt-% | 4.70 wt-% | 8.17 wt-% |
| Total | 100 wt-% | 100 wt-% | 100 wt-% |

TABLE 3

Formulations for examples and comparative experiments.

| Material | Comparative experiment 1 mg | Example 2 mg | Example 3 mg | Example 4 mg | Example 5 Mg | Example 6 mg |
|---|---|---|---|---|---|---|
| Modified nano-particle A (Acry-MT-ST) (without solvent) | 41.5 | 30.5 | — | — | — | — |
| Modified nano-particle C (Acry-F-MT-ST) (without solvent) | — | — | 84.0 | 1556.2 | — | 236.1 |
| Modified nano-particle B (Acry-IPA-ST-UP) (without solvent) | — | — | — | — | 23.52 | — |
| Dipentaerythritol pentaacrylate (reactive diluent) | 22.1 | — | — | — | — | — |
| Ethoxylated (9) trimethylolpropane triacrylate (reactive diluent) | 14.6 | — | — | — | — | — |
| Methanol (solvent) | 1379.4 | 1016 | 1588.9 | 2621.7 | 460.75 | 498.9 |
| Isopropanol (solvent) | — | — | — | — | 99.57 | — |
| Photoinitiator (Irgacure184 trademark by Ciba) | 0.39 | 0.31 | 0.21 | 3.9 | 0.15 | 10 |
| 1H,1H,6H,6H-Perfluoro-1,6-hexyl diacrylate. (reactive diluent) | — | — | — | — | — | 248 |

TABLE 4

Formulations for examples and and values for transmission, effect of increasing amount of reactive diluent on anti-reflective properties.

| | wt-% Dipentaerythritol pentaacrylate w.r.t. total weight of modified particle B and diluent | | | | |
|---|---|---|---|---|---|
| Material | Example 7 (0%) Mg | Example 8 (2.7%) Mg | Example 9 (5.8%) mg | Example 10 (11.2%) Mg | Example 11 (15.6%) mg |
| Modified nano particle B (Acry-IPA-ST-UP) | 21.7 | 22.1 | 28.0 | 26.5 | 23.3 |
| Dipentaerythritol pentaacrylate (reactive diluent) | 0 | 0.62 | 1.72 | 3.36 | 4.29 |
| Methanol (solvent) | 531.0 | 530.9 | 680.2 | 639.8 | 561.8 |
| Isopropanol (solvent) | 92.0 | 94.7 | 118.6 | 112.2 | 98.4 |
| Photo initiator (Irgacure 184 trademark by Ciba) | 0.13 | 0.14 | 0.19 | 0.18 | 0.16 |
| Maximum Transmission (%) | 97.40 | 97.40 | 97.25 | 97.20 | 96.80 |

The data from table 4, examples 7-11 show the effect of increasing amount (wt-%) of reactive diluent (Dipentaerythritol pentaacrylate) on the anti-reflective properties of surface nano-structured and nano-porous coating comprising elongated acrylated nano-particles (modified particle B (Acry-IPA-ST-UP)). It can be seen that increasing the relative weight percentage of reactive diluent with respect to nanoparticles reduces the anti-reflective performance of the coatings as the maximum percentage of transmission decreases.

Figure 7:
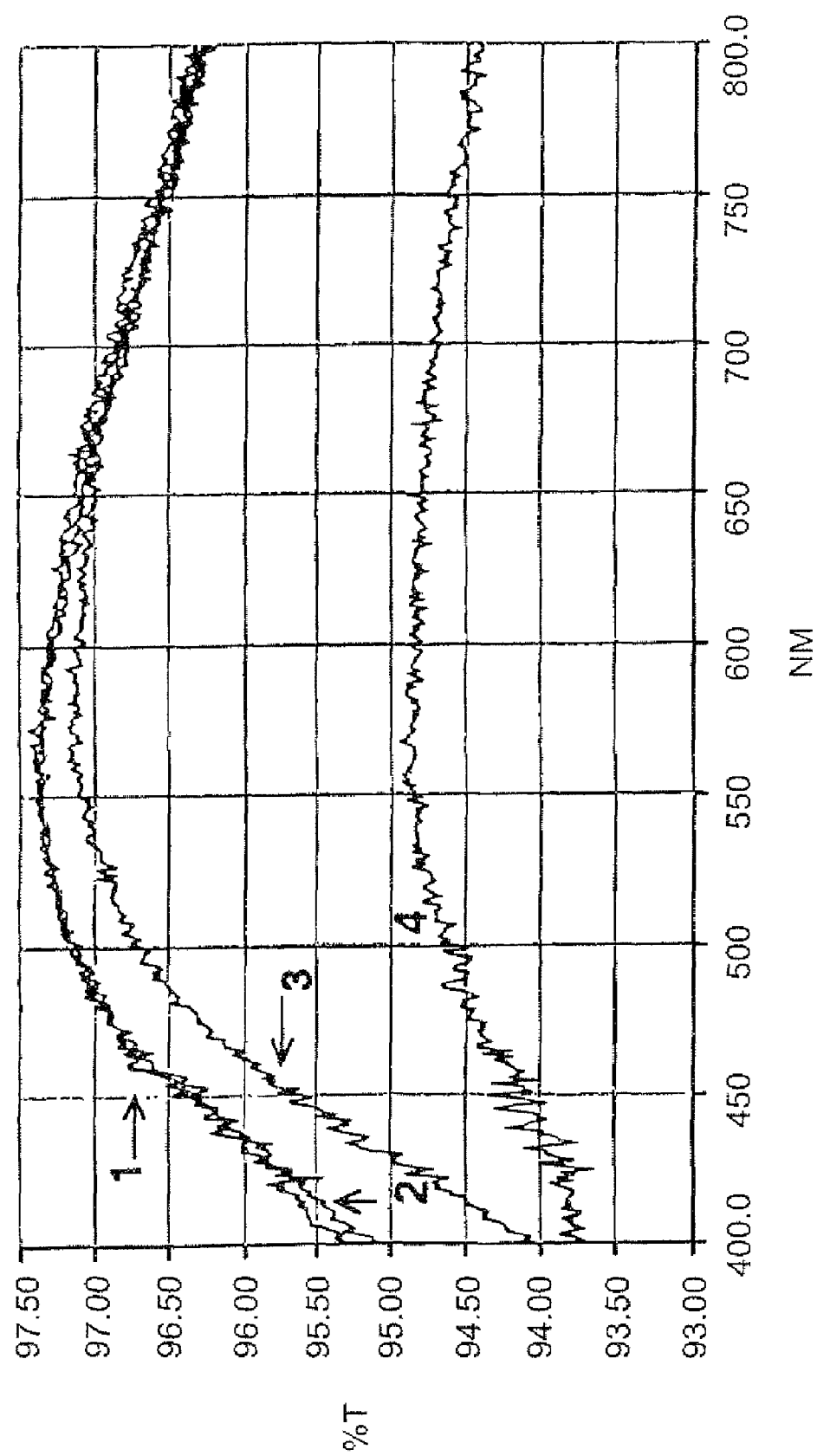
FIG. 7 is a visible transmission spectra that shows there is only a small decrease in anti-reflective properties if a reactive diluent is used in the case of elongated particles.

Transmission spectra from this series of examples can be found in FIG. 7. If the relative amount of reactive diluent is increased to the point that all nanoparticles are embedded, a non surface nano-structured and/or nano-porous coating will result. Such coatings will display no or extremely little anti-reflective performance. This can be seen illustrated by the comparative experiment, a conventional hard coat sample (thickness 100-200 nm) the transmission spectra of which can be seen as spectrum 4 in FIG. 3. Here there is almost no improvement in the maximum transmission (95%) and in hence anti-reflective performance with respect to the transmission of the glass microscope slide substrate, spectrum 5 in FIG. 7 (94.8%).

TABLE 5

Influence photo initiator concentration on Anti-reflective properties

| % Irgacure184 w.r.t. modified particle B Material | Example 12 (0.10%) mg | Example 13 (0.51%) Mg | Example 14 (0.93%) mg | Example 15 (2.09%) Mg |
|---|---|---|---|---|
| Modified nano particle B (Acry-IPA-ST-UP) | 27.4 | 28.7 | 35.2 | 23.5 |
| Methanol (solvent) | 664.1 | 672.5 | 855.8 | 570.6 |
| Isopropanol (solvent) | 119.5 | 139.8 | 150.0 | 100.0 |
| Photo initiator (Irgacure 184 trademark by Ciba) | 0.026 | 0.148 | 0.327 | 0.490 |
| Transmission Maximum | 97.2 | 97.2 | 97.3 | 97.2 |

As is shown in the results of table 5, there is no influence on the anti-reflective properties by the coatings according to the invention of the concentration of the photo initiator system. This is very favourable, and it shows the robustness of the process and the coatings according to our invention, while known systems suffer with respect to this aspect.

TABLE 6

Contact angles of various hydrophobic and hydrophilic nano-structured and/or nano-porous coatings.

| Formulation | Rmax | Contact angle t = 0 days | Contact angle t = 2.5 days |
|---|---|---|---|
| comp. exp.(Hard coat) | 6 nm | | 62.1° |
| Example 2 (Acry-MT-ST) | 119 nm | | 50.3° |
| Example 3 (Acry-F-MT-ST) (thickness 100-200 nm) | 133.5 nm | 97.3° | 120.7° |
| Example 4 (Acry-F-MT-ST) (thickness 1-5 µm) | 65.5 nm | 95.9° | 114.1° |
| Example 5 (Acry-IPA-ST-UP) | 108 nm | | 28.2° |
| Example 6 (Example 3 + Fluorodiacrylate) | 27 nm | | 108.5° |

The static water contact angle of Example 1 as shown in Table 6 is typical that of a polar acrylate hard coating. If the surface is surface nano-structured and/or nano-porous, the static water contact angle drops significantly. This is the case for Example 2 (Acry-MT-ST) where the value of the contact angle was 50.3° and for Example 5 (Acry-IPA-ST-UP) where the value is 28.2°. Similarly, the static water contact angle of Example 6, a coating of a formulation comprising hydrophobically modified reactive nano-particles (Acry-F-MT-ST) with hydrophobic reactive diluents (Fluorodiacrylate), was 108.5° and its roughness was relatively low, 27 nm. In the case of Example 4 (Acry-F-MT-ST) (thickness 1-5 µm) and 3 (Acry-F-MT-ST) (thickness 100-200 nm) the value of the roughness increased and therefore the static contact angle increased respectively as well. This demonstrates that by controlling both the surface chemistry in terms of polarity of the nanoparticles and the roughness of the resultant coating through the process according to the invention, the wetting properties can be varied greatly as well.

TABLE 7

Hardness, Reduced Modulus and Scratch results of example 2, 3 and 7

| Formulation | Hardness (Gpa) | Reduced Modulus (Gpa) |
|---|---|---|
| Example 2 Acr MT-ST | 1.2 +/− 0.1 | 22 +/− 2 |
| Example 3 Acr Fl MT-ST | 0.5 +/− 0.05 | 14 +/− 1 |
| Example 7 Acry-IPA-ST-UP | 2.5 +/− 0.2 | 45 +/− 5 |

FIG. 1 depicts the three dimensional (3D) topography of the coatings obtained in various examples and the comparative experiments acquired by atomic force microscopy (AFM). The maximum height of the features (Rmax) in these images is given as the maximum height difference over the whole area of the image. FIG. 1a shows the surface roughness of the coating according to the comparative experiment, the conventional hard coat sample, the components of which can be found in table 3, example 1. As can be deduced form this AFM image the surface roughness of the coating is very small and only in the range of ca 6 nm, which is well below the smallest dimension of the nanoparticles used in the coating. Therefore this is a not a nano-structured and/or nano-porous coating as described within the framework of the invention. For this hard coat the relative volume of reactive diluent is so large that all nanoparticles are embedded and do not contribute to the formation of a nano-structured and/or nano-porous coating. This roughness however is typical for acrylate coatings, irrespective of the presence of nanoparticles. FIG. 1b and FIG. 1c show the surface topography of coatings of fluorinated acrylated spherical nano-silicates (modified nano-particle C) (Table 3, Example 3) and a coating of acrylated spherical nano-silicates (modified nano-particle A) (Table 3, Example 2), respectively. For both of these coating the lack of any reactive diluent leads to the formation of nano-structured and nano-porous coatings as described within the framework of the invention. Similarly FIG. 1d shows a coating with a surface roughness of ca 140 nm, which is formed by the crosslinking of elongated acrylated nano-silicate particle (modified nano-particle B) (table 4, example 7) without any reactive diluent. Here again the absence of any reactive diluent leads to the formation of nano-structured and nano-porous coatings. FIG. 1e (table 4, example 8) shows the effect of small amount of reactive diluents (2.7 wt-% of total solids) on the surface topography of coatings comprising elongated acrylated nano-silicates (modified nano-particle B). It can be seen that the addition of small volumes of reactive diluents lead to a decrease of the maximum feature height (Rmax). However again the relative volumes of reactive diluent are so low that the content is below 1—the random close volume packing of the nanoparticles and thus form nano-structured and nano-porous coatings.

Figure 2A:
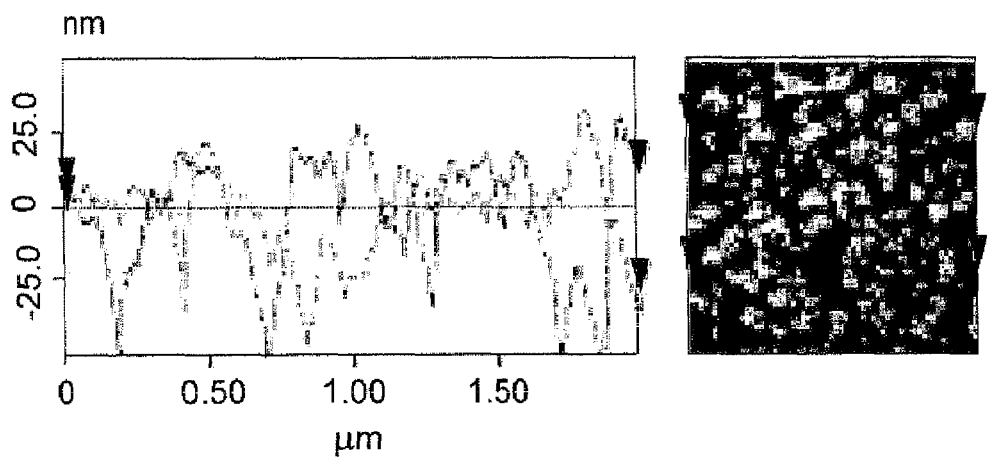
FIGS. 2A and 2B depict cross-sectional topographies of coatings obtained in Examples 2 and 7 below.
Figure 2B:
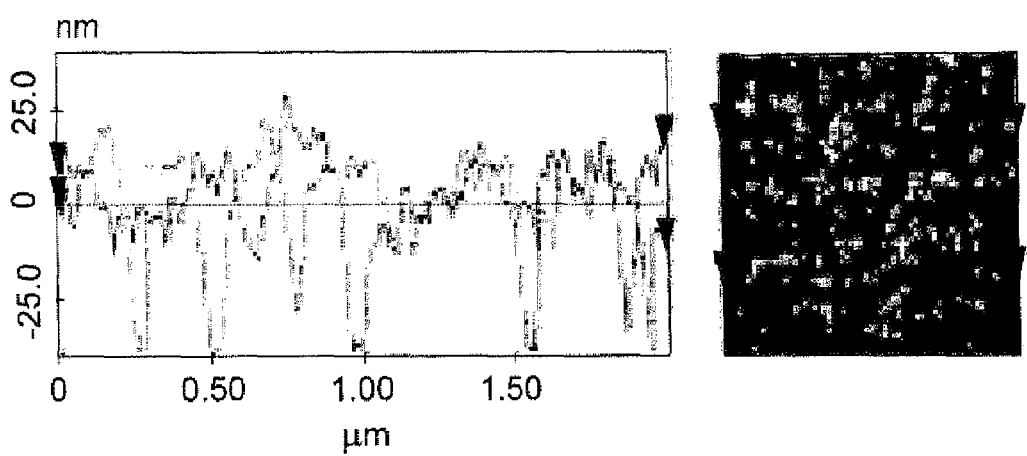

FIG. 2 shows the cross-sectional topography as acquired by Atomic force microscopy. For these cross-sections, the Rmax given in FIG. 2 is the maximum height difference across the cross-section. FIG. 2a shows the cross-sectional topography of a coating of acrylated spherical nano-silicates (modified nano-particle A) (Table 3, Example 2). Here a surface nano-structure (roughness on the surface) as well as nano-pores (deeper features) can be seen. Similarly FIG. 2b shows the cross-sectional topography of a coating of elongated acrylated nano-silicates (modified nano-particle B) (Table 4, Example 7). Again here the roughness on the surface is the surface nano-structure while the deepest features can be regarded as nano-pores. It is also expected that small voids of air will exist in the bulk of the coating between individual nano-particles or clusters thereof however, these nano-pores cannot be visualised by AFM.

Figure 3:
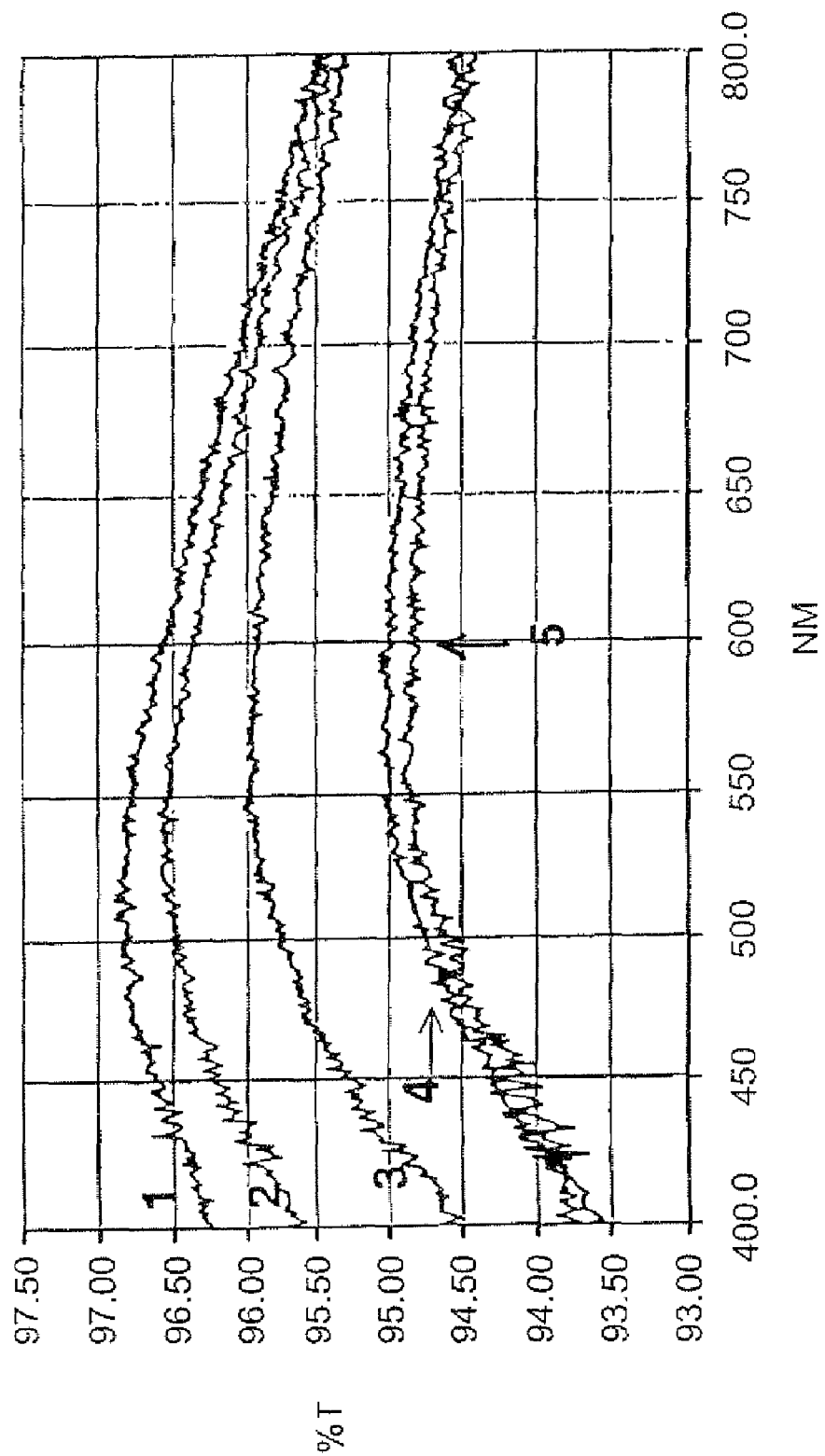
FIG. 3 is the visible transmission spectra of a number of examples and comparative coatings on one side of a glass microscope slide substrate.

FIG. 3 shows the visible transmission spectra of a number of example and comparative coatings on one side of a glass microscope slide substrate. Spectrum 5 is of an uncoated glass microscope slide. Spectrum 1 is of unmodified MT-ST nano-particles, which were spin-coated at 4800 rpm from a suspension of 3 wt-% solids, giving a coating thickness in the range of 100-200 nm. This spectrum shows that unmodified MT-ST nano-silicates display anti-reflective properties as the maximum transmission increases to ca 96.8% with respect to the maximum that of the uncoated glass microscope slides (94.8%). Obviously such a coating would have no mechanical durability as the unmodified MT-ST nano-particles are not surface modified with reactive groups and therefore are incapable of crosslinking. In this coating there is a maximum space between nano-particles, as the surface of the MT-ST nano-particles is not modified. Once the surface of these particles is grafted, the space between the nano-particles is partially filled by the polymerisable organic groups and spectrum 2 results.

This effect can be seen again when the surface modifying agent methyltrimethoxysilane groups are replaced with even bulkier groups such as 1H, 1H, 2H, 2H-(Perfluorooctyl)triethoxysilane (apolar surface derivatisation agent), see spectrum 3. In the case of spectrum 4 the space between the nano-particle is completely filled with reactive diluent and thus this conventional hard coat has a maximum transmission (95.0%), which differs very slightly from that of the uncoated glass microscope slide (94.8%).

Figure 4:
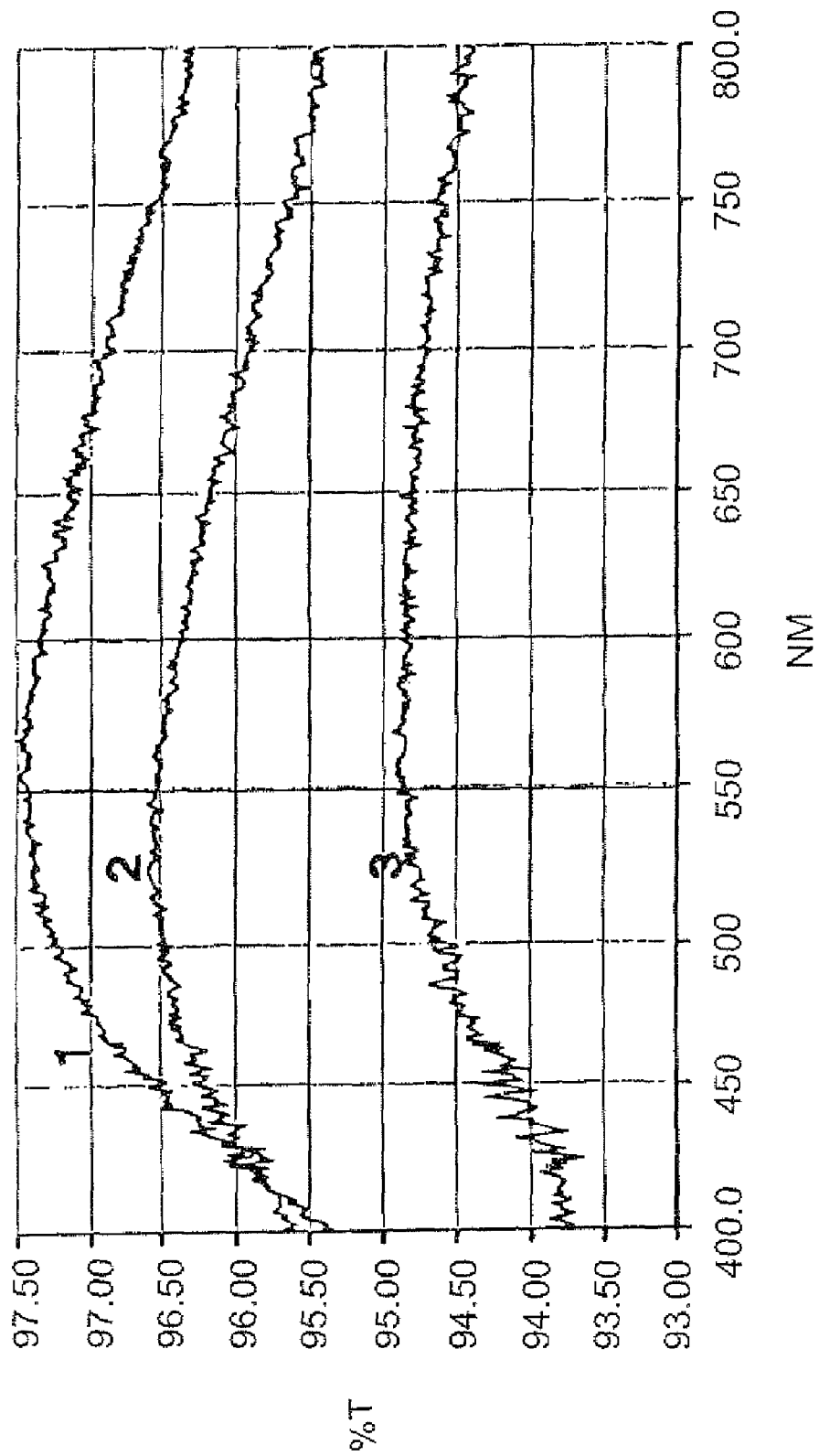
FIG. 4 is the visible transmission spectra of the coatings of Example 7 below.

FIG. 4 shows the visible transmission spectra of the coatings of example 7 (spherical particles, spectrum 2) and example 7 (elongated particles, spectrum 1) Spectrum 3 is the uncoated glass microscope slide. It is clearly shown that the coating comprising elongated particles shows even further improved anti-reflective properties compared to the coating comprising the spherical particles.

Figure 5:
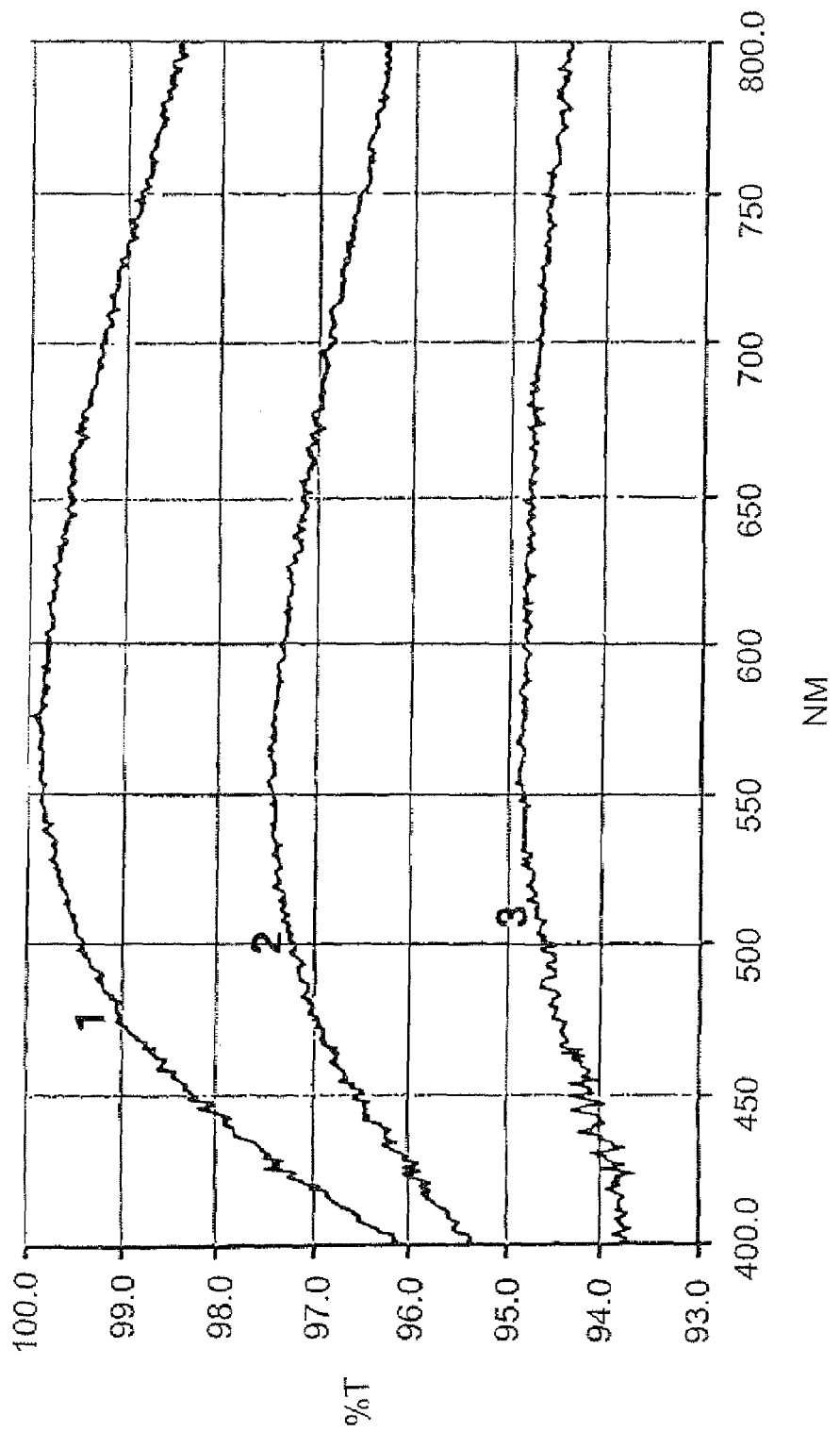
FIGS. 5 and 6 are visible transmission spectra showing the effect of coating both sides of glass microscope slides and PET films, respectively, with a coating of crosslinked acrylated elongated nano-particles.
Figure 6:
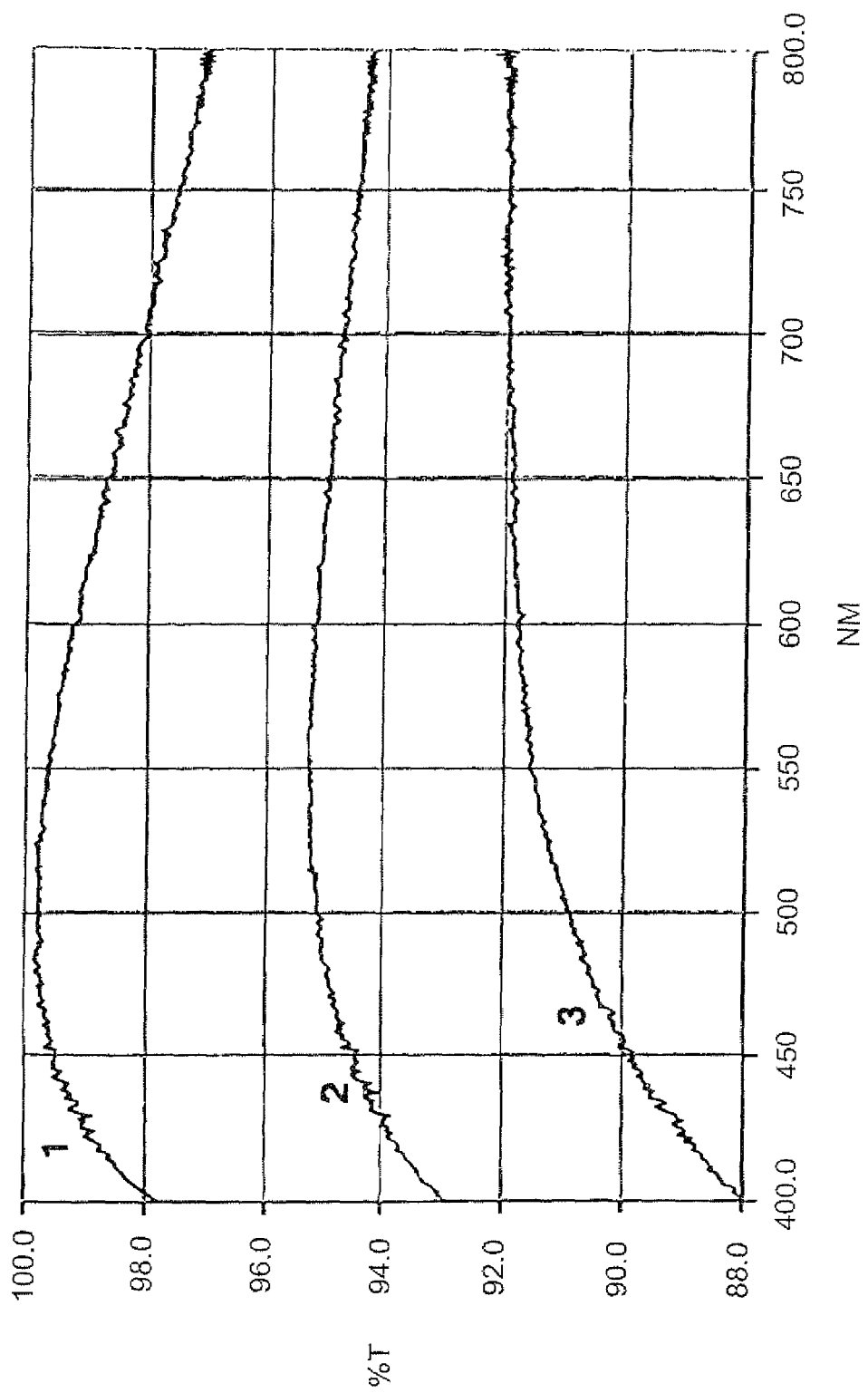

FIGS. 5 and 6 show the effect of coating both sides of reflective substrate, glass microscope slides in the case of FIG. 5 and PET films in case of FIG. 6, with a coating of crosslinked acrylated elongated nano-particles (Acry-I PA-ST-UP, modified particle B). As both the top and bottom surface of the untreated substrates cause reflection transmission greater than 98% are usually only possible if both sides of the substrate have been coated. In the case of both of these examples the coating on both sides of the substrates results in objects, which are almost invisible to the naked eye and where surface reflections are only observable, by direct reflection of bright light sources.

FIG. 7 shows that in case of elongated particles there is only a small decrease in anti-reflective properties if a reactive diluent is used.

Example 16

Preparation of Durable Anti-Reflective Coating System on Top of Hard Coat

In the first step a hard coat according to comparative experiment 1 is applied to the substrate to a thickness of ca 3-5 μm and cured in Air at a total UV dose of 0.75 Jcm$^{-2}$. The surface of the resulting hard coat was partially cured. In the second step a coating according to the invention is applied on top of the Hard coat to a thickness of 100-200 nm by spin coating as described previously.

The said coating according to the invention consists of the following components; 0.376 g (dry weight) reactive nano-particle (modified Particle B, Table 2), 0.061 g of Dipentaerythritol penta-acrylate (reactive diluent), 0.013 g tri-methylolpropane tri-(3-mercaptopropionate) (reactive diluent and adhesion promoter), 0.8 mg of propyl gallate (polymerisation inhibitor), 5.1 mg of Irgacure 907 (photo-initiator), 12,902 g of methyl ethyl ketone (solvent) and 1.642 g of isopropanol (solvent).

The said coating according to the invention is then fully cured with a total of 2×1 Jcm$^{-2}$ and subsequently heated to 120° for ca 1 minute using an infra red lamp. The resultant nano-structured coating has a pencil hardness of 2-3 H according to ASTM D3363-00, while retaining anti-reflective properties.

The use of hard coat which is partially cured at the surface, addition of multi-functional thiols and subsequent thermal post-backing, after fully UV curing the combined system, as described above, improves the mechanical durability of all coatings with respect to the coatings where these steps are not taken.

The invention claimed is:

1. An antireflective coated substrate comprising:
   a) a solvent-swollen acrylate-based first coating that is partially cross-linked with a percent relative reacted acrylate unsaturation (% Relative RAU) of less than 90%, and
   b) a nano-structured acrylate-based second coating on the first coating, said second coating being substantially completely cross-linked with a % Relative RAU of at least 95%.

2. The coated substrate of claim 1, in which the first coating has a % Relative RAU of less than 80%.

3. The coated substrate of claim 1, in which the first coating has a % Relative RAU of less than 70%.

4. The coated substrate of claim 1, wherein the second coating has a % Relative RAU of substantially 100%.

* * * * *